United States Patent
Rehder et al.

(10) Patent No.: US 9,954,349 B2
(45) Date of Patent: Apr. 24, 2018

(54) TWO-PART SNAP-TOGETHER FEEDTHROUGHS

(71) Applicant: The Boeing Company, Chicago, IL (US)

(72) Inventors: Eric M. Rehder, Los Angeles, CA (US); Dale H. Waterman, Rancho Cucamonga, CA (US); John Steven Frost, Oak Park, CA (US); John F. Suarez, Mission Viejo, CA (US); Kristina I. Kassem, Mission Viejo, CA (US); Jonah C. Huffman, Riverside, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/682,442

(22) Filed: Aug. 21, 2017

(65) Prior Publication Data

US 2017/0353023 A1    Dec. 7, 2017

Related U.S. Application Data

(63) Continuation-in-part of application No. 15/153,461, filed on May 12, 2016, now Pat. No. 9,741,474.
(Continued)

(51) Int. Cl.
*H02G 3/18* (2006.01)
*H02G 3/22* (2006.01)
(Continued)

(52) U.S. Cl.
CPC ............... *H02G 3/22* (2013.01); *F16L 5/027* (2013.01); *H01B 17/26* (2013.01)

(58) Field of Classification Search
CPC ............ H02G 3/22; F16L 5/027; H01B 17/26
(Continued)

(56) References Cited

U.S. PATENT DOCUMENTS

| | | | | |
|---|---|---|---|---|
| 3,423,518 A | * | 1/1969 | Weagant | H02G 3/0675 174/153 G |
| 4,234,218 A | * | 11/1980 | Rogers | B29C 61/0608 285/149.1 |

(Continued)

FOREIGN PATENT DOCUMENTS

| | | |
|---|---|---|
| DE | 4212563 | 10/1993 |
| DE | 20218979 | 4/2004 |

(Continued)

*Primary Examiner* — Sherman Ng
(74) *Attorney, Agent, or Firm* — Haynes and Boone, LLP

(57) ABSTRACT

A feedthrough for feeding signals through a panel having opposite sides includes first and second parts. The first part can include a first body configured to be disposed in a first portion of an opening in a panel, a first lumen disposed within the first body, and a first engagement area comprising a first contact area. The second part can include a second body configured to be disposed in a second portion of the opening in the panel, a second lumen disposed within the second body, and a second engagement area configured to engage the first contact area, wherein engaging the first contact area with the second engagement area causes deformation of the first part, the second part, or both to hold the first part and the second part within the opening such that the first lumen and the second lumen are disposed generally concentrically with each other.

20 Claims, 20 Drawing Sheets

Related U.S. Application Data

(60) Provisional application No. 62/233,254, filed on Sep. 25, 2015.

(51) Int. Cl.
*F16L 5/02* (2006.01)
*H01B 17/26* (2006.01)

(58) Field of Classification Search
USPC .......................................... 174/650, 653, 656
See application file for complete search history.

(56) References Cited

U.S. PATENT DOCUMENTS

| | | | |
|---|---|---|---|
| 4,525,000 A | | 6/1985 | Bachle |
| 5,068,496 A | * | 11/1991 | Favalora ................... F16L 5/06 174/654 |
| 6,034,325 A | | 3/2000 | Nattel et al. |
| 2005/0109523 A1 | | 5/2005 | Snyder |
| 2011/0309071 A1 | | 12/2011 | Lin |
| 2015/0047898 A1 | * | 2/2015 | Sagdic ................. H01R 13/506 174/657 |

FOREIGN PATENT DOCUMENTS

| | | |
|---|---|---|
| EP | 1627581 | 2/2006 |
| WO | WO2010/092101 | 8/2010 |

* cited by examiner

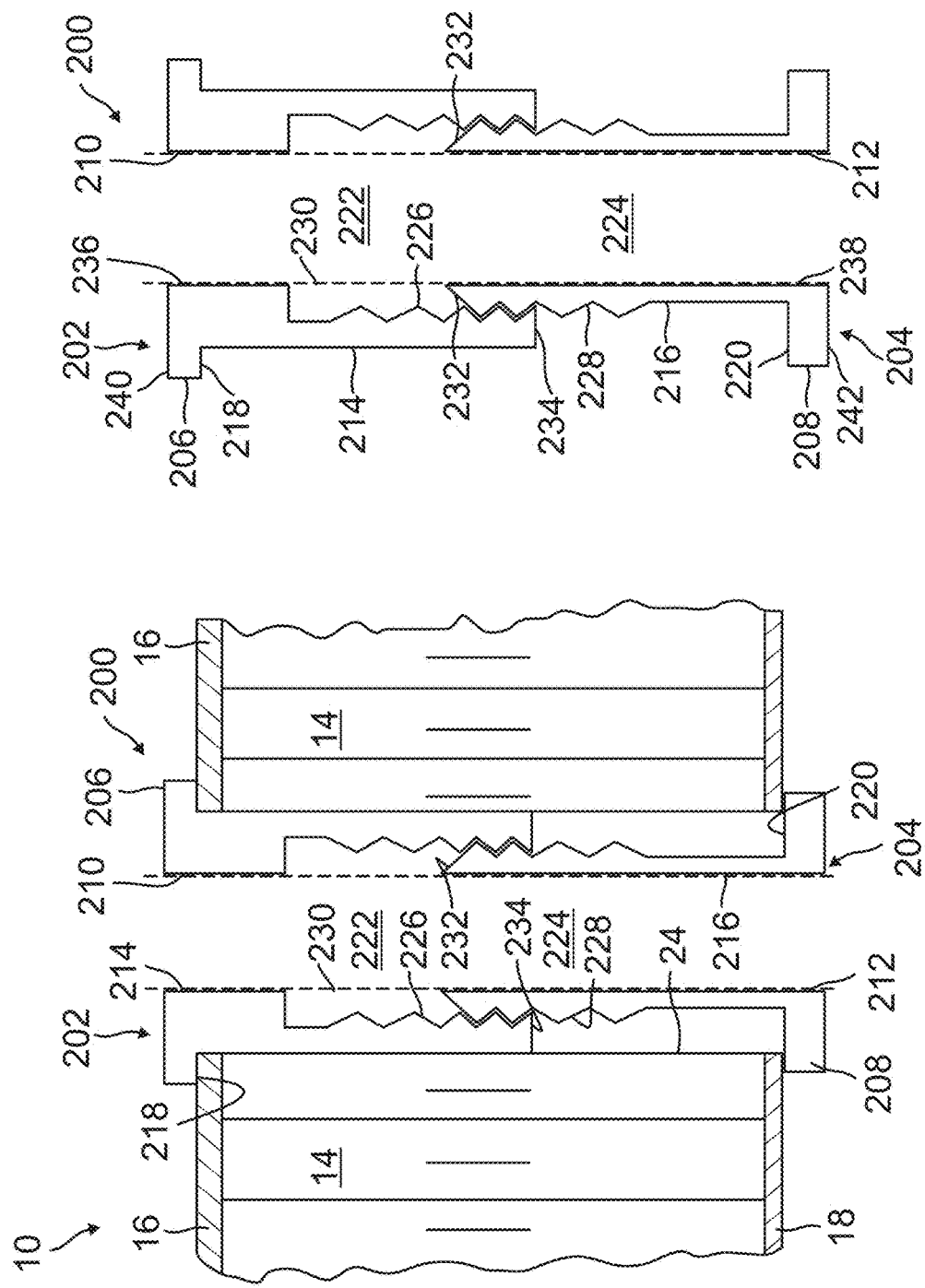

TWO-PART SNAP-TOGETHER FEEDTHROUGHS

CROSS-REFERENCE TO RELATED APPLICATIONS

This application is a continuation-in-part of U.S. patent application Ser. No. 15/153,461 filed May 12, 2016 and entitled "TWO-PART SNAP-TOGETHER FEEDTHROUGHS" (now U.S. Pat. No. 9,741,474 issued Aug. 22, 2017), which claims priority to and the benefit of U.S. Provisional Patent Application No. 62/233,254 filed Sep. 25, 2015 and entitled "TWO-PART SNAP-TOGETHER FEEDTHROUGHS," which are hereby incorporated by reference in their entirety.

BACKGROUND

1. Technical Field

This disclosure relates to feedthroughs, in general, and in particular, to two-part, snap-together feedthroughs for enabling signals, e.g., electrical signals, to be conveyed from one side of a panel to the other side of the panel.

2. Related Art

In a number of fields, it is often necessary to convey a signal, e.g., an electrical signal, from one to the other side of a wall, barrier, tank or other boundary. For example, in the case of solar cell panels used on, e.g., orbital satellites and the like, the panels can be relatively thick (typically 1-3 cm), and can incorporate an electroconductive honeycomb core, e.g., aluminum, for strength and stiffness. One side of the panels can be populated with solar cells, while the opposite, or backside of the panels can incorporate circuitry and associated wiring, e.g., power and switching interconnects, for the cells. The wires conveying electrical signals between the cells and the backside circuitry typically pass through the panel, rather than around its edges, and therefore need to be protected from any sharp edges located within the panel and adjacent to the opening through which they pass.

Currently, interconnects between the front and back surfaces of the panel are made by inserting a piece of tubing cut to length slightly greater than the thickness of the panel. The tubing is then bonded to front and back faces of the panel. This approach has some drawbacks, in that it is laborious and time-consuming to implement, and incurs the risk of shorting the conductor(s) of the wire to the panel. Accordingly, a need exists in the industry for improved techniques for feedthroughs (e.g., including interconnects).

SUMMARY

In accordance with examples of the present disclosure, novel, two-piece, snap-together feedthroughs are disclosed, together with methods for making and using them, that are reliable, inexpensive, simple to install, that protect wires passing through them from sharp edges in the panel and around the termination hole, and optionally, can include a conductive path that enables a signal to pass through the panel without the use of separate wires.

In one example, a feedthrough can include a first part and a second part. The first part can include a first body configured to be disposed in a first portion of an opening in a panel, a first lumen disposed within the first body, and a first engagement area including a first contact are. The second part can include a second body configured to be disposed in a second portion of the opening in the panel, a second lumen disposed within the second body, and a second engagement area configured to engage the first contact area. Engaging the first contact area with the second engagement area can cause deformation of the first part and/or the second part to hold the first part and the second part within the opening such that the first lumen and the second lumen are disposed generally concentrically with each other.

In another example, feedthrough can include a first part and a second part and the first part can include a first body configured to be disposed in a first portion of an opening in a panel, a first lumen disposed within the first body, and a first engagement area including a plurality of first ridged sections. The second part can include a second body configured to be disposed in a second portion of the opening in the panel, a second lumen disposed within the second body, and a second engagement area including a plurality of second ridged sections disposed within the second lumen and configured to engage at least a portion of the first ridged sections. The first engagement area and the second engagement area, when engaged, are configured to hold the first part and the second part within the opening such that the first lumen and the second lumen are disposed generally concentrically with each other.

Advantageously, an electrical signal is conveyed through the feedthrough from one side of the panel to the other side thereof by inserting an electroconductive wire through the concentric lumens of the tubular segments of the two parts, or alternatively, by forming a pair of electroconductive paths, each disposed on an interior surface of a respective one of the lumens of the two tubular segments, and electroconductively connecting the electroconductive paths to each other when the first and second parts are coupled together through the opening.

A better understanding of the two-part, snap-together feedthroughs of the present disclosure, as well as an appreciation of example methods for making and using them, will be afforded to those of skill in the art by a consideration of the following detailed description of one or more examples thereof. In this description, reference will be made to the various views of the appended sheets of drawings, which are briefly described below, and within which, like reference numerals are used to identify like ones of the elements illustrated therein.

BRIEF DESCRIPTION OF THE DRAWINGS

FIG. 2A is a partial cross-sectional view of a panel incorporating an example of a feedthrough in accordance with the present disclosure;

FIG. 2B is a cross-sectional view of an alternative example feedthrough of FIG. 2A, showing an optional electroconductive path extending therethrough;

DETAILED DESCRIPTION

In accordance with the present disclosure, examples of novel, two-piece, snap-together feedthroughs are disclosed, together with methods for making and using them, that are reliable, inexpensive, quick and easy to install, that protect wires passing through them from sharp edges in the panel and around the termination hole, and optionally, that can include conductive paths that enable signals to pass through the panel without the use of conventional wires.

Figure 1:
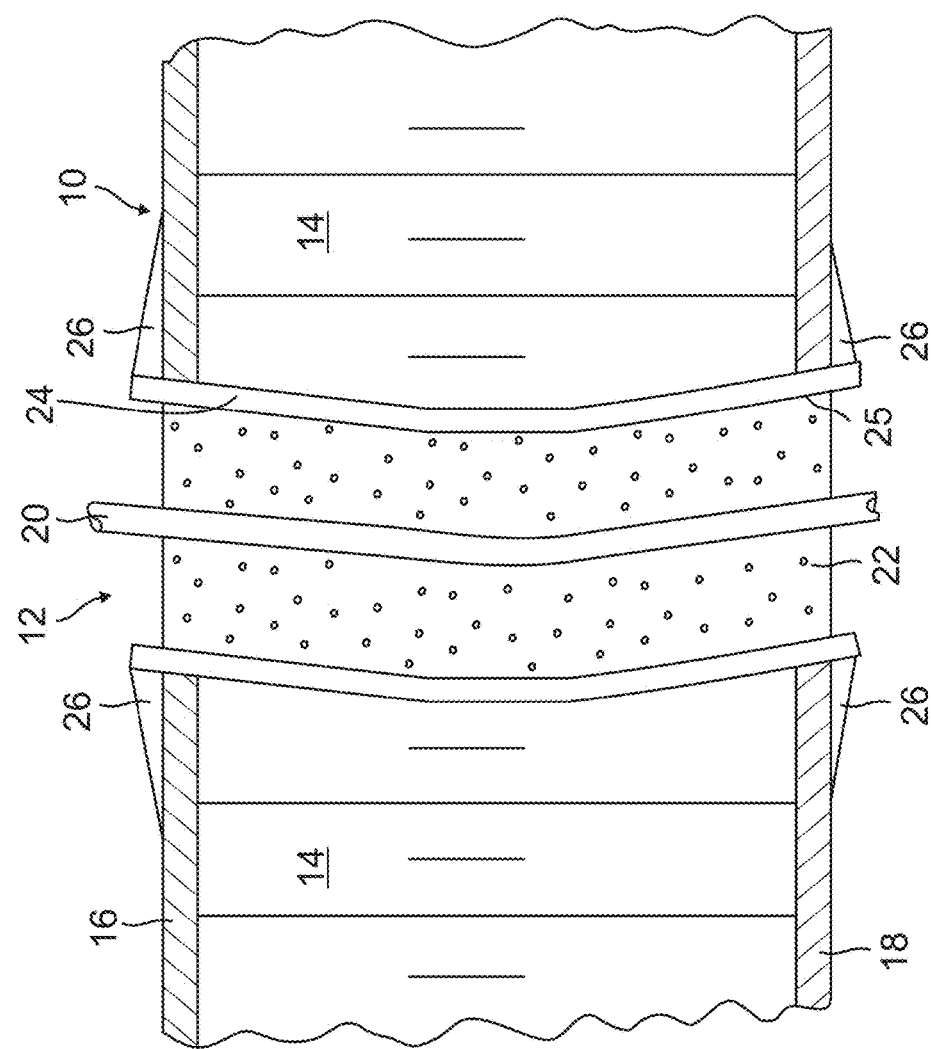
FIG. 1 is a partial cross-sectional view of a panel incorporating a feedthrough, comprising a short length of insulated wire, in accordance with the prior art.

FIG. 1 is a partial cross-sectional view of a panel 10 incorporating a feedthrough 12 in accordance with the prior art. The panel 10 can comprise, for example, a solar cell panel having a honeycomb core 14 made of, e.g., an aluminum alloy, that is sandwiched between two opposite face sheets 16 and 18. In one possible configuration, one surface or side, e.g., a top or front side, of the panel 10 can be populated with solar cells (not illustrated), while the opposite, bottom or backside of the panel 10 can incorporate associated wiring for the cells. Since these wires pass through the panel 10, and because the honeycomb core 14 can exhibit sharp edges and be electroconductive, they need to be protected from sharp edges possible through the panel 10 and around the termination hole.

In one example, illustrated in FIG. 1, the wires conveying electrical signals between the cells and the backside wiring are conveyed through the panel 10 by means of a conventional feedthrough 12. The conventional feedthrough 12 comprises a short length of tubing 25 that is inserted through a through-opening 24 formed, e.g., by drilling or another process, through the panel 10, and then bonded with an adhesive 26 to adjacent ones of the face sheets 16 and 18 at the opposite ends of the through-opening 24. An electroconductive wire 20, e.g., copper, which can be either uninsulated or surrounded by a jacket 22 of an insulating material, is then passed through the lumen of the tubing 25 from the front side to the back side of the panel 10.

Installation of the tubing within the through-opening 24 requires manual labor to custom cut each piece to the thickness of the panel 10. Additionally, installation of the tubing requires the use of an adhesive, with its related complications of mess, mixing, open times, and curing requirements. What is needed then are feedthroughs that are reliable, inexpensive, and simple to install, that protect wires passing through them from sharp edges in the panel and around the termination hole, and optionally, that can include electroconductive paths 236, 238 that enable a signal to pass through the panel without the use of separate, discrete wires.

FIG. 2A is a partial cross-sectional view of a panel 10 incorporating an example of a two-piece, snap-together feedthrough 200 in accordance with the present disclosure, and FIG. 2B is a cross-sectional view of an alternative of the example feedthrough 200 of FIG. 2A, showing an optional electroconductive path extending through a common lumen 230 of the feedthrough 200 continuously from one end thereof to the other.

As illustrated in FIGS. 2A and 2B, the feedthrough 200 comprises first and second parts 202 and 204. Each part 202 and 204 includes an associated flange 206 or 208 with an opening 210 or 212 extending therethrough. A tubular segment 214 or 216 extends normally from a first surface 218 or 220 of a corresponding one of the flanges 206 or 208, and each of the tubular segments 214 and 216 has a corresponding lumen 222 or 224 disposed generally concentrically with the corresponding opening 210 or 212.

Of importance, the tubular segments 214 and 216 of each of the first and second parts 202 and 204 further include a pair of complementary engaging mechanisms 226 and 228, which are respectively disposed on a distal end portion, i.e., an end portion opposite the corresponding flange 206 or 208, of an associated one of the tubular segments 214 or 216. As illustrated in FIG. 2A, the engaging mechanisms 226 and 228 are configured to engage each other and couple the first and second parts 202 and 204 together through an opening 24 in a panel 10 having opposite sides or surfaces in a snap-together fashion, such that the first surface 218 or 220 of each of the flanges 206 and 208 is held against a corresponding one of the opposite surfaces of the panel 10, and the lumens 222 and 224 of respective ones of the tubular segments are disposed generally concentrically with each other so as to form a "common lumen" 230 (indicated by the dashed lines in FIGS. 2A and 2B) that extends completely through the feedthrough 200, and hence, the panel 10.

In the example illustrated in FIGS. 2A and 2B, the complementary engaging mechanisms 226 and 228 respectively comprise a set of radially protruding teeth extending circumferentially around an inner circumferential surface of the tubular segment 214 of the first part 202, and a corresponding set of radially protruding teeth extending circumferentially around an outer circumferential surface of the tubular segment 216 of the second part 204.

Additionally, in some examples, the radially protruding teeth of the two parts 202 and 204 can comprise complementary helical threads disposed on respective ones of the tubular segments 214 and 216 instead of discrete teeth, which can either snap together longitudinally, as described above, or alternatively, screw together longitudinally, in the manner of a conventional nut and bolt.

In the illustrated example of FIGS. 2A and 2B, the first and second parts 202 and 204 are also shown as being generally cylindrical in shape. However, as those of some skill will understand, the cross-sectional shape of the two parts 202 and 204, including the flanges 206 an 208 can, like the thorough-opening 24 itself, have other shapes, e.g., polygonal or elliptical, depending on the particular application at hand. Also, as those of some skill may note, in the illustrated example feedthrough 200 of FIGS. 2A and 2B, the tubular segment 214 of the first part 202 is illustrated as having an outer diameter corresponding to the diameter of the through-opening 24 of the panel 10, whereas, the outer diameter of the tubular segment 216 of the second part 204 is sized to enable it to slide coaxially into the lumen 222 of the tubular segment 214 of the first part 202. However, as discussed below in connection with other possible examples, it is also possible to configure the tubular segments 214 and 216 to have the same or substantially similar outside and/or inside diameters or widths, and as to the engaging mechanisms of the examples, these can be disposed either symmetrically or asymmetrically with respect to both longitudinal and/or transverse planes of the feedthroughs, again, depending on the application at hand.

As illustrated in FIGS. 2A and 2B, the distal end of the tubular segment 216 of the second part 204 can be provided with a tapered surface 232 such that, when it is pushed into abutment with the opposing surface 234 of the distal end of the tubular segment 214 of the first part 202, the tapered surface 232 compresses or deflects the side walls of the distal end portion of the tubular segment 216 of the second part 204 radially inward, and/or expands the side walls of the distal end portion of the tubular segment 214 of the first part 202 radially outward, such that the respective teeth of the engaging mechanisms can slide up and over one another sequentially in a longitudinal direction as the two parts 202 and 204 are pushed together within the through-opening 24. Of course, the tapered surface 232 can alternatively be located on the distal end of the tubular segment 214 of the first part 202, or indeed, both distal ends of the tubular segments 214 and 216 can be provided with complementary beveled or tapered surfaces to effect the foregoing radial expansion/compression function. Additionally or in the alternative, as discussed below in connection with some alternatives, other features can be implemented in the sidewalls of the tubular segments 214 and 216 of the two parts 202 and 204 to facilitate their radial expansion and/or compression during engagement of the interdigitating teeth of the complementary engaging mechanisms 226 and 228.

As discussed above, one of the desired features of the novel feedthrough 200 is to provide electrical insulation between any electrical conductor extending through the feedthrough 200 and the panel 10 through which it extends. In this regard, it is advantageous to make the two parts 202 and 204 of a dielectric material, e.g., a strong plastic material, which can comprise a thermoplastic, such as Acrylonitrile Butadiene Styrene (ABS) or Nylon, or a thermosetting plastic material, e.g., polyurethane or an epoxy resin. As an example, plastic material suitable for a space flight environment could include WINDFORM XT, a polyamide-and-CARBOND composite material. Generally speaking, materials intended for use in a space flight environment should be suitable for that environment, which can range between −150 degrees C. and +175 degrees C., and should exhibit low outgassing, and pass the ASTM E595-77/84/90 test. Advantageously, in some examples, the parts 202 and 204 can be molded using precision injection molding techniques, and if desired, can be reinforced with embedded fibers, e.g., glass, carbon, aramid, or boron fibers, for additional strength.

As discussed above, it can be desirable in some cases to provide an electroconductive path through the feedthrough 200 to enable a signal to be conveyed from one side of the panel 10 to the other without resorting to the insertion of a conductive wire through the feedthrough 200. As illustrated in FIG. 2B, this can be advantageously achieved by providing a pair of electroconductive paths 236 and 238 respectively disposed on the interior surface of an associated one of the lumens 222 and 224 of the two tubular segments 214 and 216, and arranging them such that the two electroconductive paths 236 and 238 are electroconductively coupled to each other when the first and second parts 202 and 204 are coupled together through the through-opening 24.

As illustrated in the particular example of FIG. 2B, the formation of the two electroconductive paths 236 and 238 can comprise plating respective ones of their inner surfaces with an electroconductive metal plating, e.g., gold or copper, or alternatively, molding a metal foil or insert into the interior wall surfaces, such that when the respective teeth of the two engaging mechanisms 226 and 228 are interdigitated with each other during installation, at least a portion of the conductive path 238, for example, that disposed on the tapered surface 232 of the distal end of the tubular segment 216, is disposed in an electroconductive mechanical contact with the other electroconductive path 236.

Of course, other implementations of the electroconductive paths 236 and 238 are possible. For example, the electroconductive paths 236 and 238 could comprise longitudinal bands of a conductive metal respectively disposed on the interior surfaces of the two tubular segments 214 and 216, having respective ends that couple to each other during installation of the feedthrough 200. In such an example, it might be desirable to provide an indexing mechanism, such as a complementary longitudinal tongue-and-groove arrangement discussed below, that is configured to orient the first and second parts 202 and 204 at a selected angular position relative to each other when the first and second parts 202 and 204 are coupled together through the through-opening 24, such that the respective ends of the two conductive bands are disposed in alignment with each other.

In the particular example of FIG. 2B, each of the flanges 206 and 208 of the first and second parts 202 and 204 includes a second surface 240 or 242 that is opposite to the corresponding first surface 218 or 220 thereof, and each of the electroconductive paths 236 and 238 extends to a corresponding one of the second surfaces 240 or 242. The provision of these two conductive surfaces 240 and 242 enables electrical connections, such as a solder joint or a weld joint, to be made to components or wiring respectively disposed on the opposite surfaces of the panel 10 without having to make them within the more constricted common lumen 230 of the installed feedthrough 200.

Figure 3A:
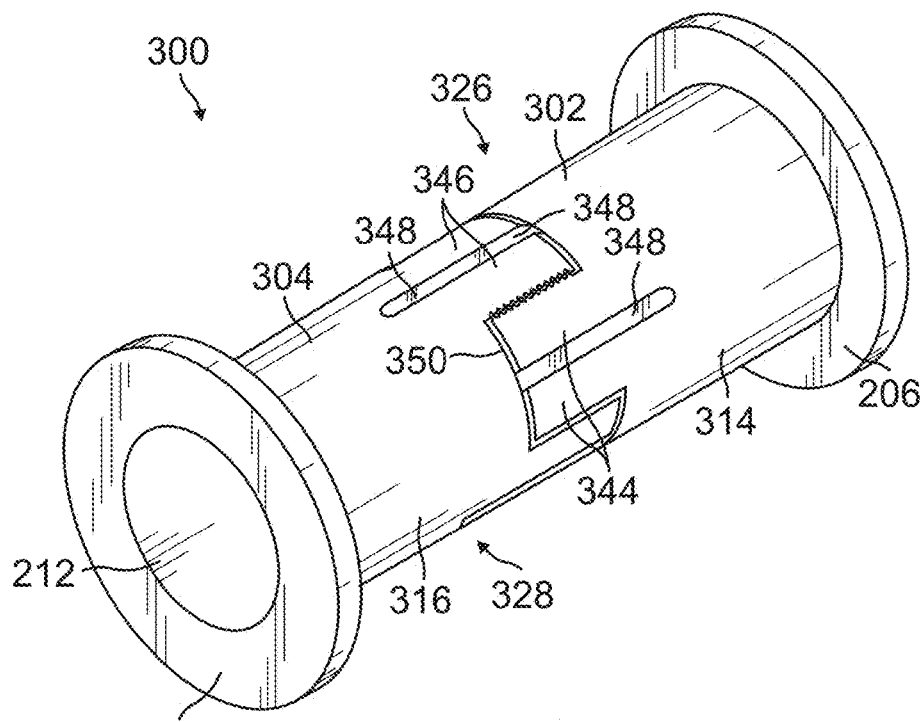
FIG. 3A is an end-and-side perspective view of another example of a feedthrough in accordance with the present disclosure.
Figure 3B:
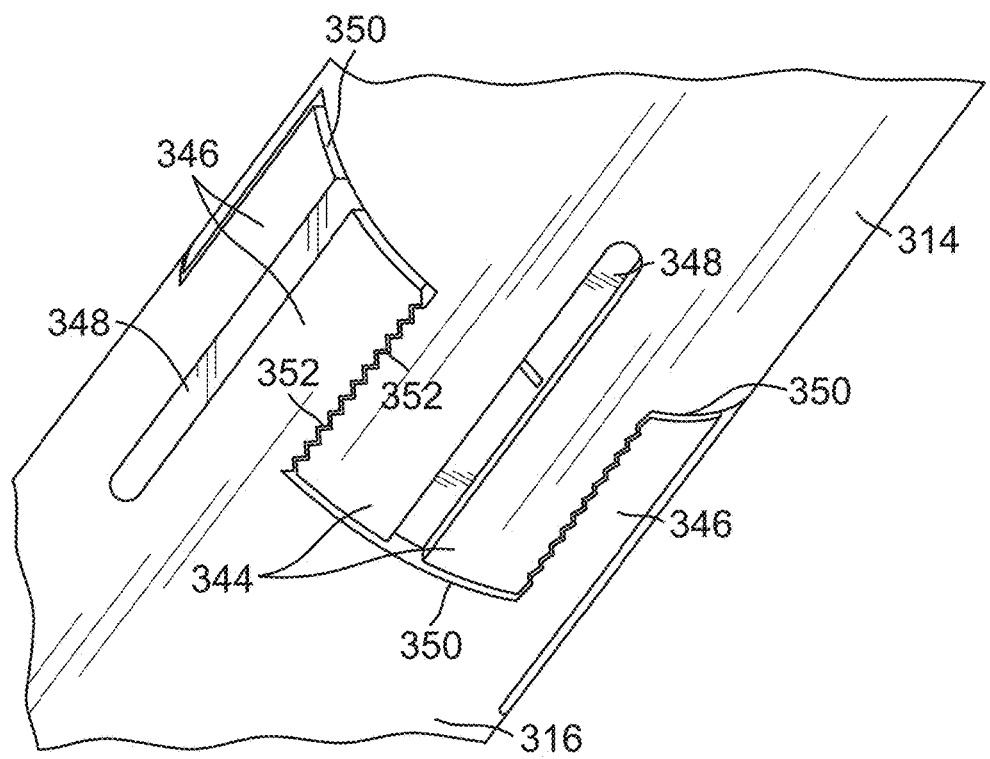
FIG. 3B is an enlarged side perspective view of a middle portion of the example feedthrough of FIG. 3A.
Figure 3C:
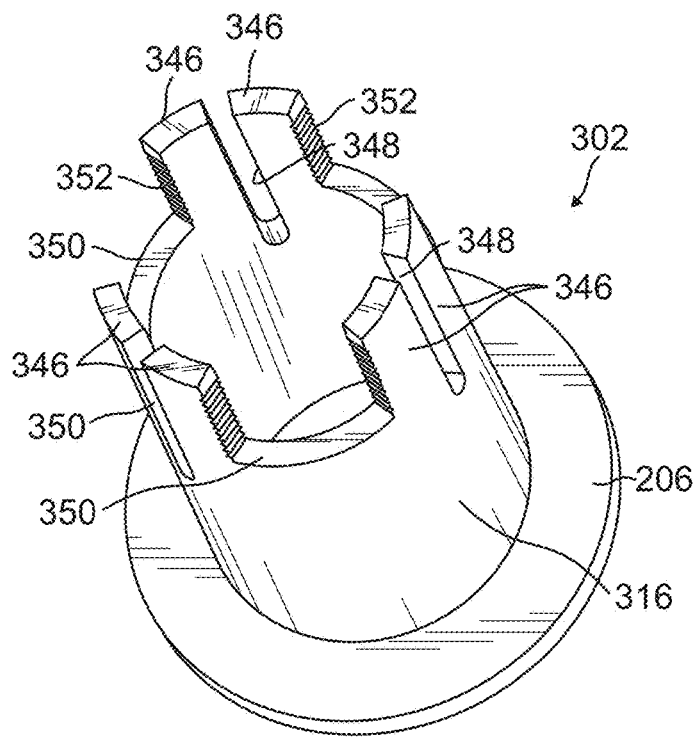
FIG. 3C is a distal-end-and-side perspective view of a part of the feedthrough of FIG. 3A.
Figure 3D:
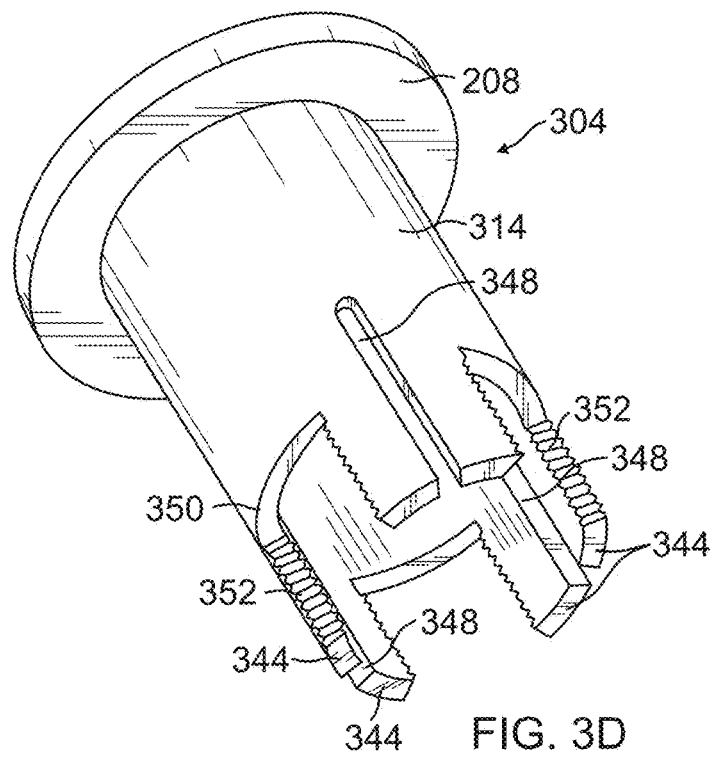
FIG. 3D is a distal-end-and-side perspective view of another part of the feedthrough of FIG. 3A.

FIG. 3A is an end-and-side perspective view of another example of a feedthrough 300 in accordance with the present disclosure. FIG. 3B is an enlarged side perspective view of a middle portion of the example feedthrough of FIG. 3A, and FIGS. 3C and 3D are distal-end-and-side and perspective view of first and parts 302 and 304 of the feedthrough of FIG. 3A. As can be seen in these figures, the example feedthrough 300 is similar in many respects to the example feedthrough 200 of FIGS. 2A and 2B, and differs from the former primarily in the manner in which the complementary engaging mechanisms 326 and 328 are implemented.

In particular, it may be noted that the respective inner and outer diameters of the two tubular segments 314 and 316 are the same, and as illustrated in, e.g., FIG. 3B, the engaging mechanisms 326 and 328 comprise complementary castellations 344 and 346 respectively formed at the distal ends of associated ones of the two tubular segments 314 and 316. Each castellation 344 or 346 engages within a complementary notch 350 in the distal end of the other part 302 or 304. Additionally, each castellation 344 and 346 is bifurcated by a longitudinal slot 348 that extends rearwardly from a corresponding distal end thereof. As discussed above, the longitudinal slots 348 enable the distal ends of the halves of the associated castellations 344 or 346 to spring sideways, i.e., in a circumferential direction, such that respective groups 352 of longitudinally extending, circumferentially protruding teeth disposed on opposing side surfaces of the castellation halves can spring into interdigitated engagement with each other when the two parts 302 and 304 are pushed into engagement with each other longitudinally. It may be noted that, in this example, the two parts 302 and 304 are identical to each other, thereby enabling a reduction in the number of parts, and hence, the cost of the feedthrough 300, to be achieved.

Figure 4A:
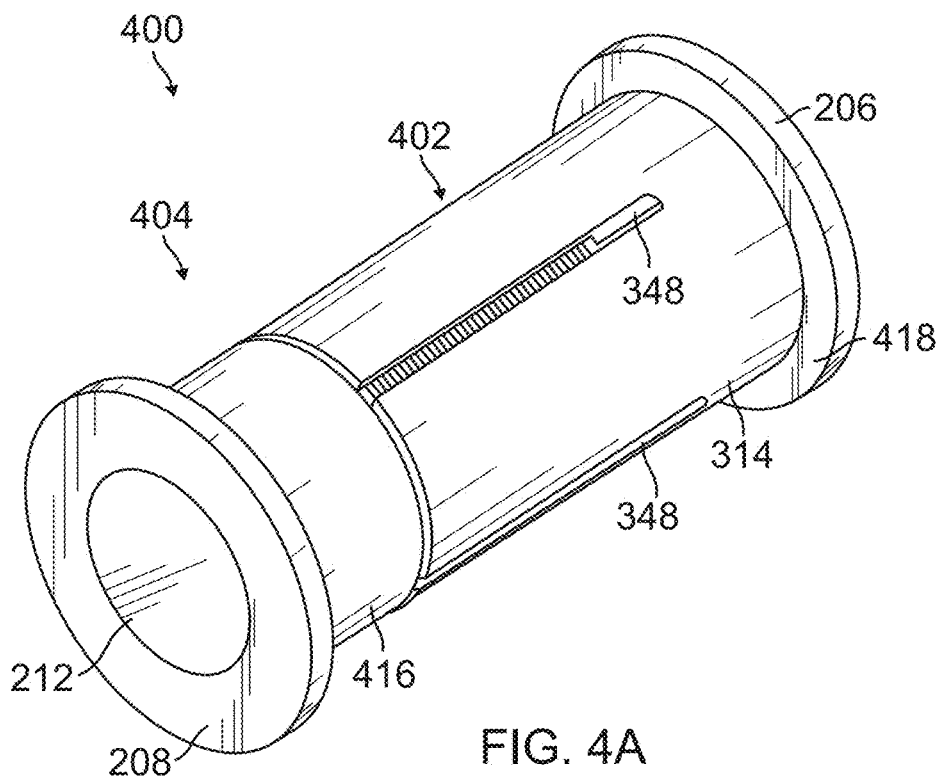
FIG. 4A is an end-and-side perspective view of another example of a feedthrough.
Figure 4B:
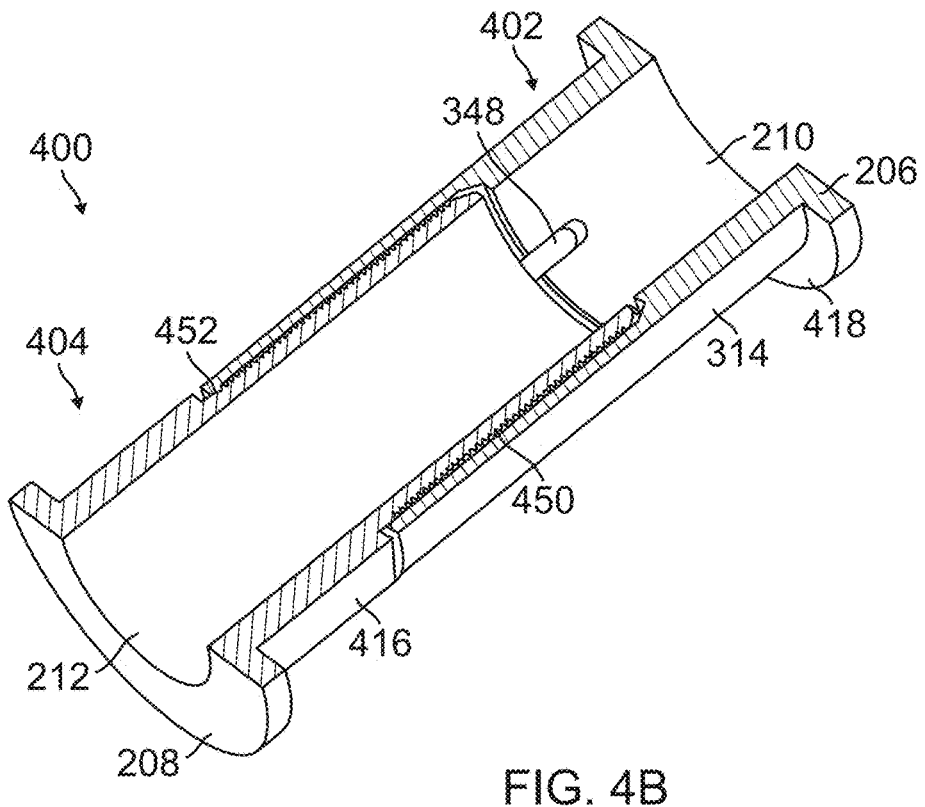
FIG. 4B is a cross-sectional end-and-side perspective view of the example feedthrough of FIG. 4A.
Figure 4C:
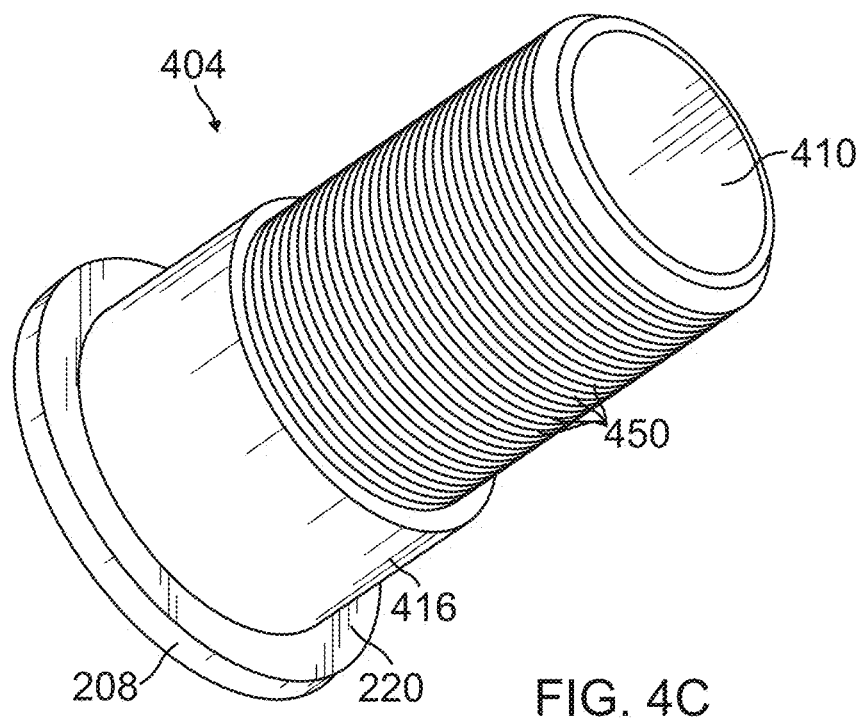
FIG. 4C is a distal-end-and-side perspective view of a part of the feedthrough of FIG. 4A.
Figure 4D:
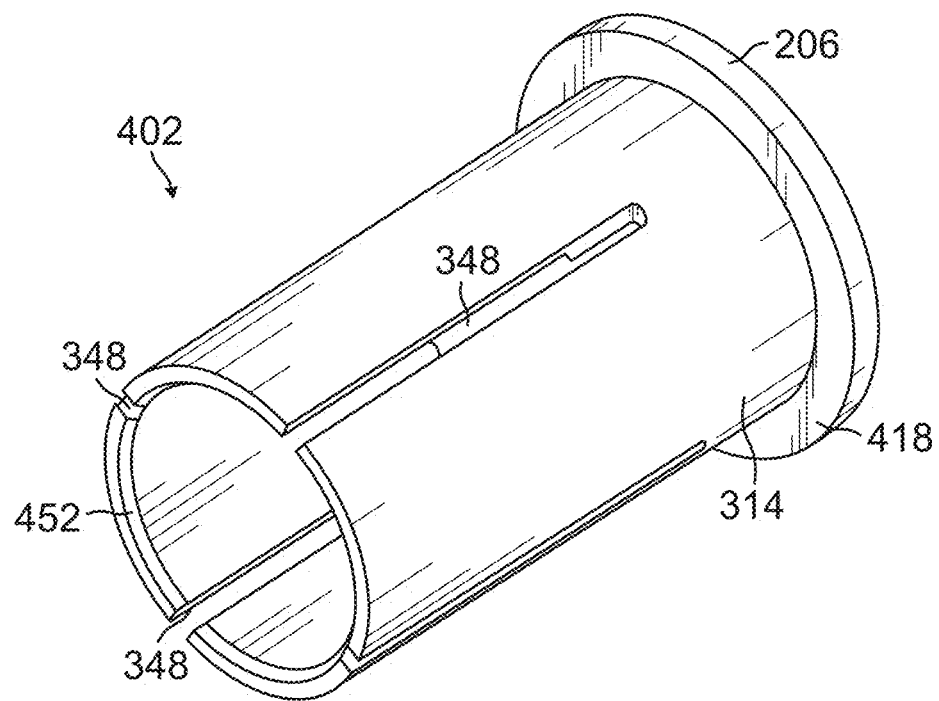
FIG. 4D is a distal-end-and-side perspective view of another part of the feedthrough of FIG. 4A.

FIG. 4A is an end-and-side perspective view of another example of a feedthrough 400 in accordance with the present disclosure. FIG. 4B is a cross-sectional end-and-side perspective view of the example feedthrough of FIG. 4A, and FIGS. 4D and 4C are distal-end-and-side perspective view of first and second parts 402 and 404 of the feedthrough of FIG. 4A, respectively. This example feedthrough 400 is somewhat similar to that of FIG. 3, except as regards the complementary engaging mechanisms. In this example, the respective inner and outer circumferential side walls of the distal end portions of the tubular segments 416 and 418 are both reduced in thickness to respectively accommodate a group 450 of circumferentially extending, radially protruding teeth, in the case of the second part 404, or a single circumferentially extending, radially protruding tooth 452, in the case of the first part 402, that interdigitate when the two parts 402 and 404 are pushed together in the through-opening 24. In one example of FIG. 4, the teeth of the group 450 on the second part 404 protrude radially inward, whereas, the single tooth 452 protrudes radially outward.

Figure 5:
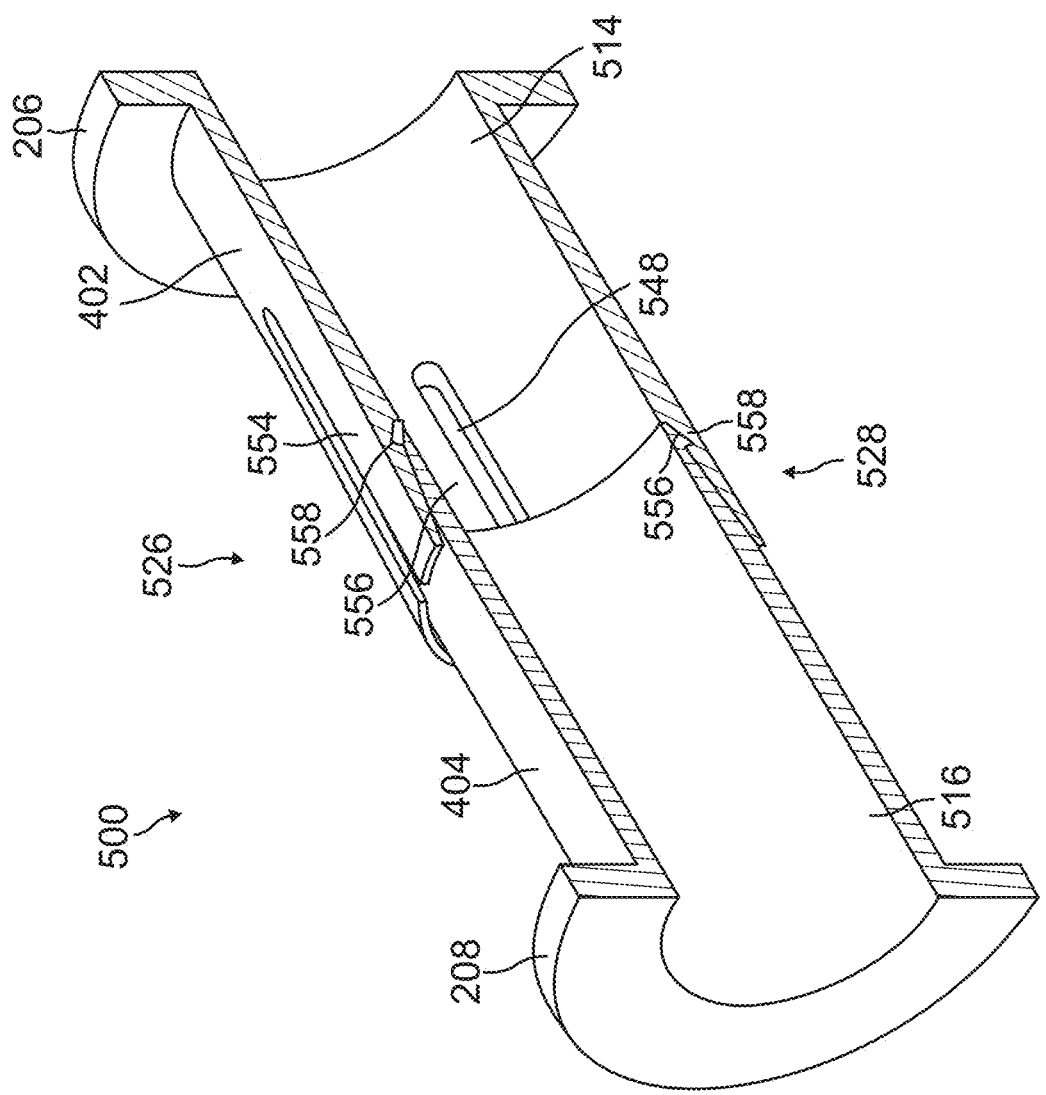
FIG. 5 is a cross-sectional end-and-side perspective view of another example of a feedthrough.

FIG. 5 is a cross-sectional end-and-side perspective view of another example feedthrough 500. The example feedthrough 500 is similar to the previously described examples, except that the complementary engaging mechanisms 526 and 528 comprise fingers 554 that extend longitudinally from the distal ends of associated ones of the tubular segments 514 and 516 and past the distal end of the other one of the tubular segments 514 or 516. As illustrated in FIG. 5, each of these fingers 554 can be defined by a pair of longitudinally extending slots 548 disposed in the side walls of a corresponding one of the tubular segments 514 and 516, as discussed above, to enable the fingers 554 to bend in the radial direction, and each of the fingers 554 can include a radially extending tooth 556 at its distal end that engages within a corresponding, complementary groove 558 in the sidewall of the other tubular segment 514 or 516.

A feature of this example is the ability for the outward diameter of one part to pass through the panel 10 face sheets 16 or 18 in an unexpanded state and then expand to engage the other part. This enables the through-opening 24 in the panel 10 to be the same diameter as the unexpanded outer diameter of the tubular segments 514 and 516, thus minimizing the size of the through-opening 24 that is needed in the panel 10.

Figure 6A:
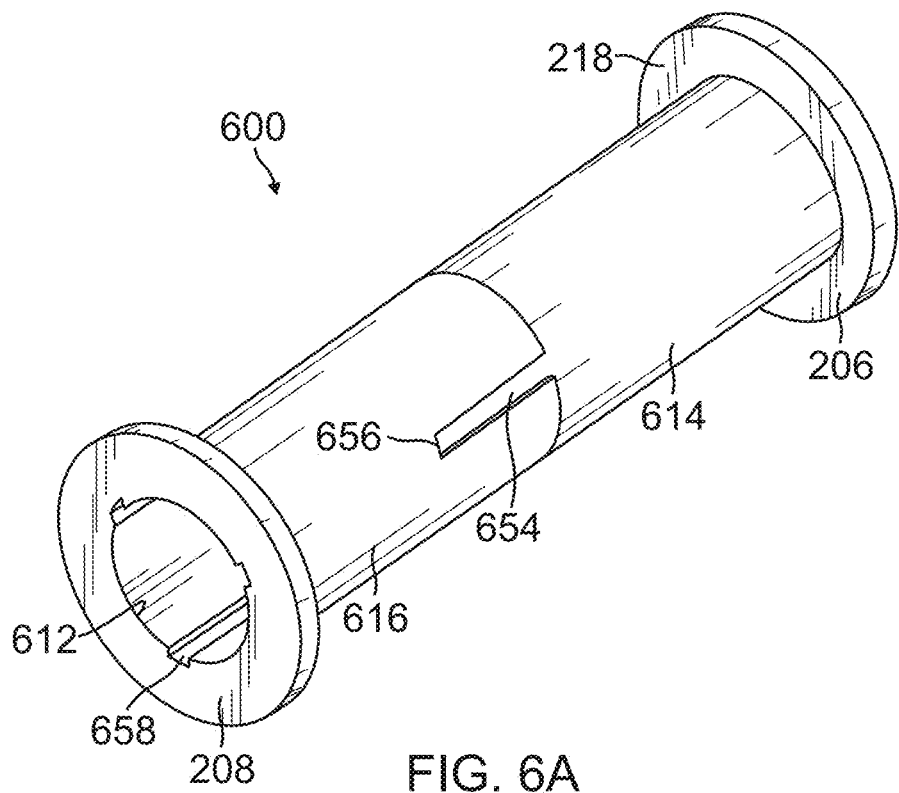
FIG. 6A is an end-and-side perspective view of another example of a feedthrough.
Figure 6B:
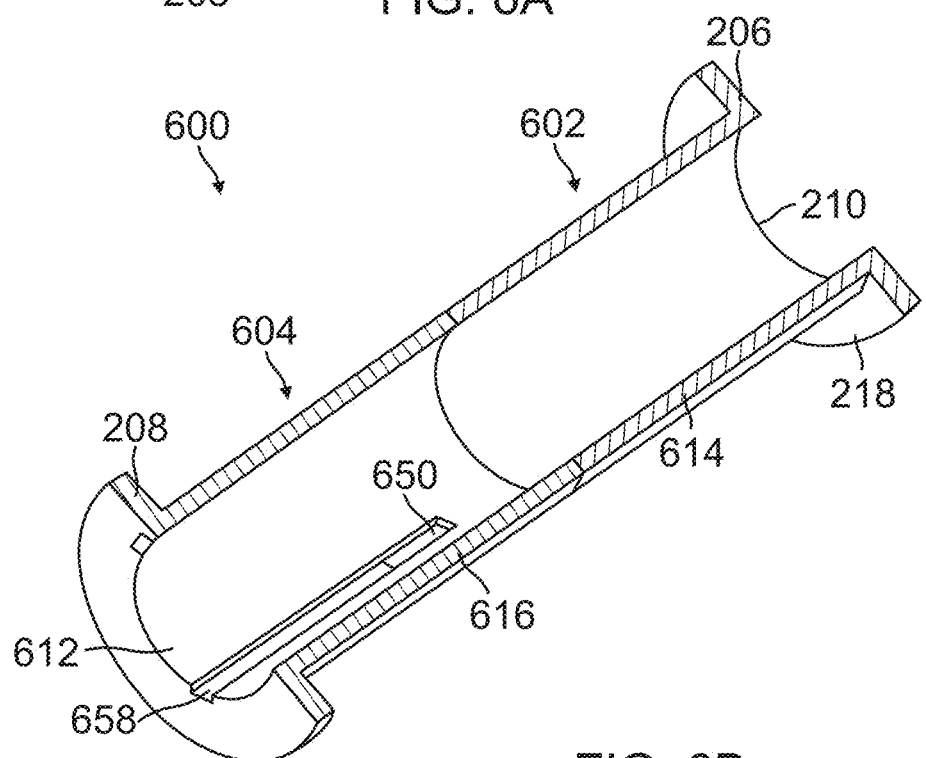
FIG. 6B is a cross-sectional end-and-side perspective view of the example feedthrough of FIG. 6A.
Figure 6C:
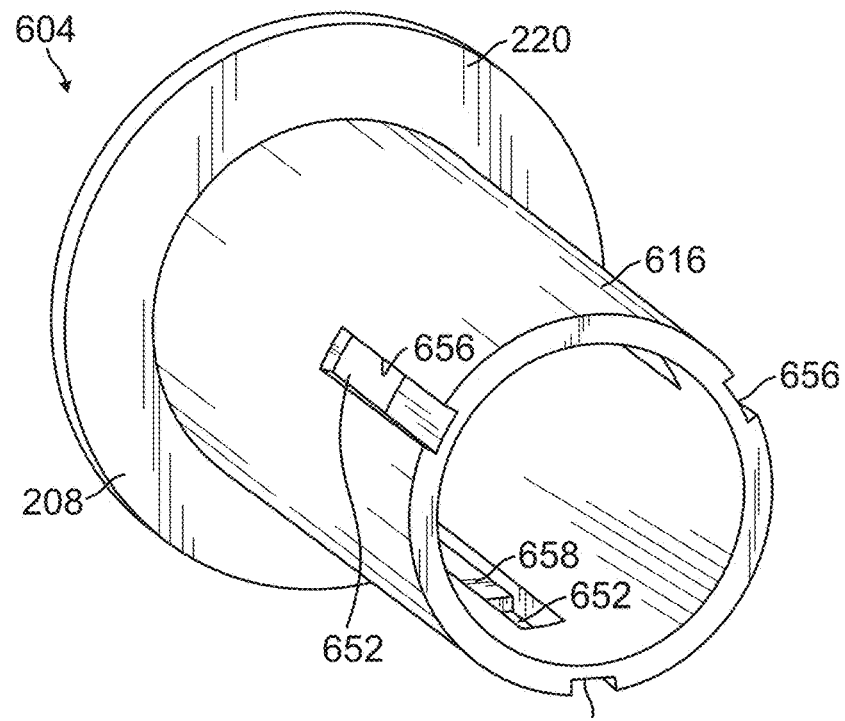
FIG. 6C is a distal-end-and-side perspective view of a part of the feedthrough of FIG. 6A.
Figure 6D:
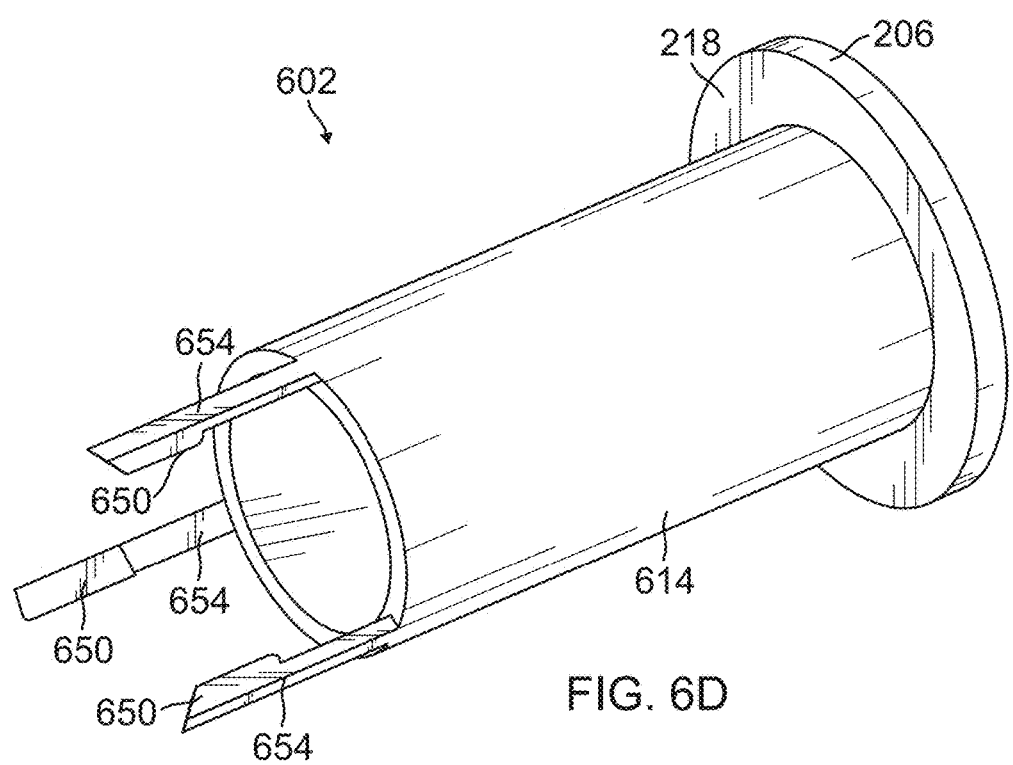
FIG. 6D is a distal-end-and-side perspective view of another part of the feedthrough of FIG. 6A.

FIG. 6A is an end-and-side perspective view of another example of a feedthrough 600. FIG. 6B is a cross-sectional end-and-side perspective view of the example feedthrough 600 of FIG. 6A, and FIGS. 6D and 6C are distal-end-and-side perspective views of a first and second part 602 and 604 of the feedthrough 600, respectively.

The feedthrough 600 is similar to that of FIG. 5, except that the longitudinal fingers 654 extending longitudinally from the distal end of the tubular segment 614 of the first part 602 are received in corresponding longitudinal slots 656 disposed in the outer circumferential surface of the distal end portion of the tubular segment 616 of the second part 604. Additionally, as can be seen in the cross-sectional view of FIG. 6B, the distal end portion of each longitudinal finger 654 is provided with a radially extending tooth 650 that is received in a corresponding through-slot 652 in the sidewall of the tubular segment 616 of the second part 604 in an over-center locking type of engagement. Additionally, as seen in, e.g., FIG. 6A, a plurality of slots 658 respectively extend longitudinally in the inner circumferential surface of the tubular segment 616 of the second part 604 from the associated flange opening 612 and into corresponding ones of the through-slots 652. The internal longitudinal slots 658 enable a tool (not illustrated) inserted in the flange opening 612 of the second part 604 to depress the respective teeth 650 of the longitudinal fingers 654 out of engagement with their respective through-slots 652 so that the feedthrough 600 can be easily uninstalled from a panel 10 within which it has been assembled.

Figure 7:
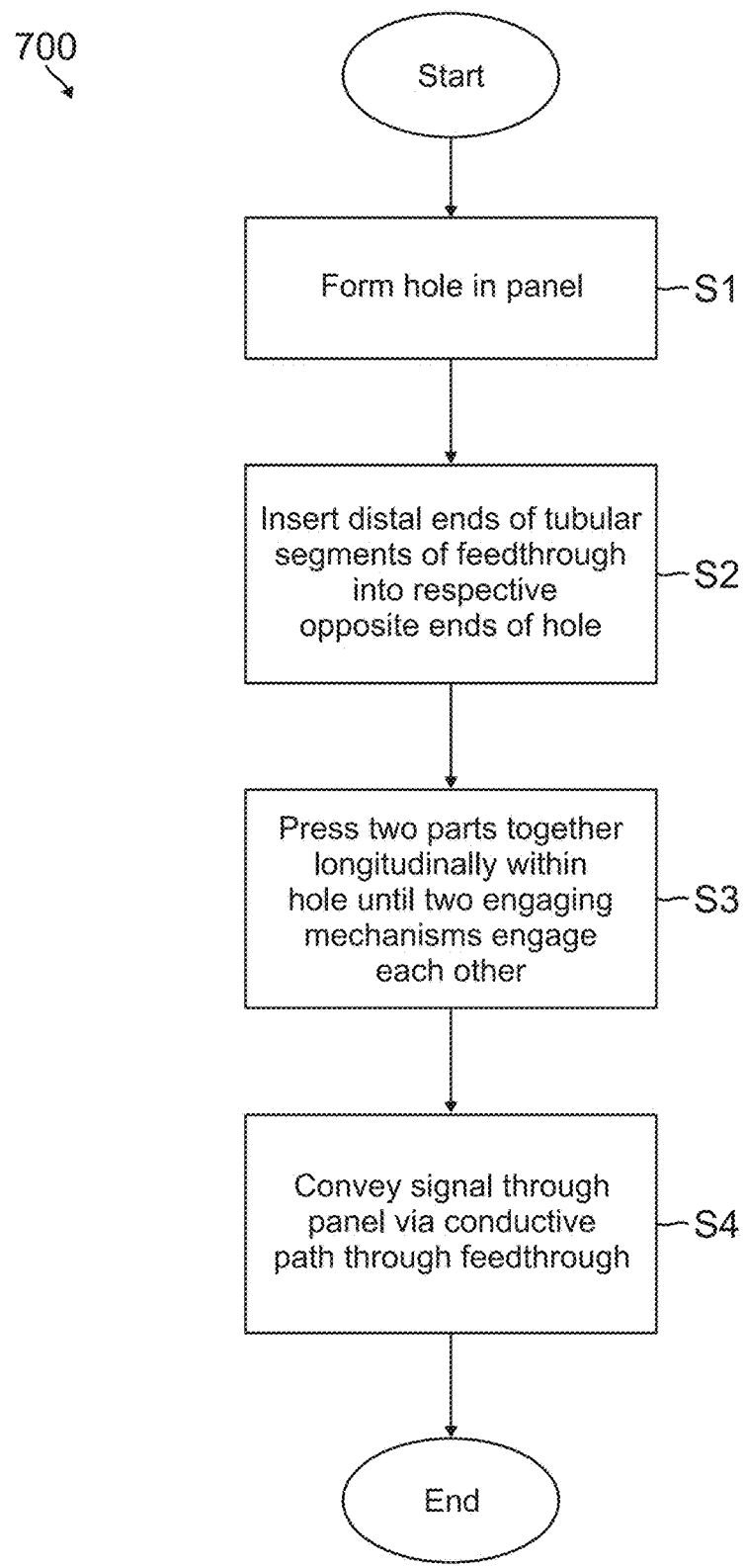
FIG. 7 is a functional block diagram of an example method for using the novel feedthroughs of the present disclosure.

FIG. 7 is a functional block diagram of an example method 700 for using the novel feedthroughs of the present disclosure. Thus, at S1 of the example method 700, a hole is formed in a panel through which it is desirable to convey a signal, e.g., an electrical signal. At S2, of the method, distal ends of respective ones of the two feedthrough parts are inserted into corresponding ones of the opposite ends of the hole. At S3, the two parts of the feedthrough are pressed together longitudinally within the hole such that the complementary engaging mechanisms engage each other in a snap-together fashion, such that the first surface of each of the flanges of the two parts is held against a corresponding one of the opposite surfaces of the panel, and the lumens of respective ones of the tubular segments are disposed generally concentrically with each other to form a common lumen of the installed feedthrough. At S4, the signal is conveyed through common lumen of the feedthrough via, in one case, an electroconductive wire inserted through the common lumen, or alternatively, through a conductive path disposed on the interior surface of the common lumen, as discussed above.

Figure 8A:
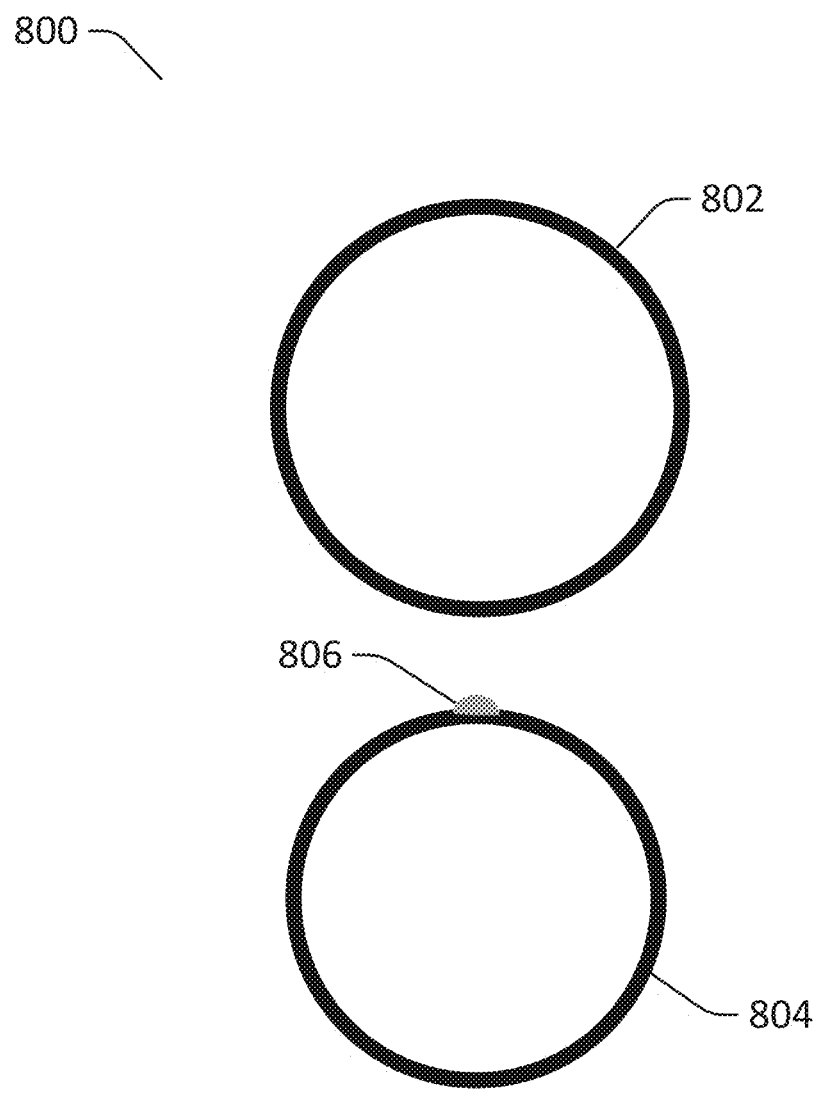
FIG. 8A is a cross-sectional view of a feedthrough with parts of dissimilar cross-sectional shapes.

FIG. 8A is a cross-sectional view of a feedthrough with parts of dissimilar cross-sectional shapes. FIG. 8A shows a cross-sectional view of a disassembled feedthrough 800 with a first part 802 and a second part 804. The first part 802 and the second part 804 can include different cross-sectional areas.

The cross-section view shown in FIG. 8A illustrates the first part 802 as a cylinder with a larger inner diameter than the majority of the outer diameter of the second part 804. The portion of the second part 804 shown in FIG. 8A is configured to be inserted into the first part 802. Though the majority of the outer diameter of the portion of the second part 804 shown in FIG. 8A is smaller than the inner diameter of the portion of the first part 802, other portions of the second part 804 and/or first part 802, not illustrated in FIG. 8A, can include equal inner and/or outer diameters, or inner and/or outer diameters that are sized differently from that illustrated in FIG. 8A.

Furthermore, the second part 804 includes a contact area 806. The contact area 806 can be a portion of the second part 804 that can be a raised bump. Other examples of the second part 804 can include contact areas of other configurations, such as a plurality of raised bumps, a raised ridge, deformation of the second part 804 (e.g., shaping the second part 804 with an oblong cross-section), and other such contact areas. In other examples, the first part 802 can, additionally or alternatively, include a contact area.

The second part 804 that includes the contact area 806 is configured to be inserted into the inner diameter of the first part 802. As the second part 804 is inserted into the first part 802, the contact area 806 can contact the interior of the first part 802 and, thus, distort and/or deform the first part 802. The distortion and/or deformation shifts the clearances so that the contact area 806 contacts the first part 802 while certain other portions of the second part 804 do not contact the first part 802. Thus, the second part 804 can slide into the first part 802.

Distortion and/or deformation of the first part 802 and/or the second part 804 can result in additional frictional forces that hold the first part 802 and the second part 804 together. In such examples, the shape of the contact area, the characteristics of the materials of the first part 802 and/or the second part 804 (e.g., the modulus of the materials), the shapes of the first part 802 and the second part 804, and other such factors can be used to determine the amount of force holding the first part 802 and the second part 804 together. Accordingly, one of more contact areas of the first part 802 and/or the second part 804 can hold the first part 802 and the second part 804 together. Additional contact areas can include other features such as detents, corresponding bumps for such detents, and/or other such features that can further hold the parts together and/or allow for the parts to be engaged by snapping into place.

Figure 8B:
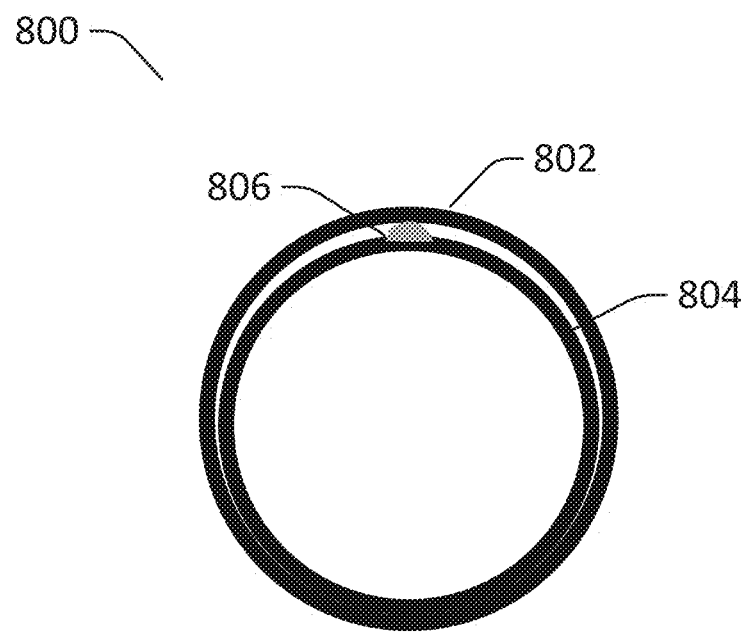
FIG. 8B is a cross-sectional view of the feedthrough of FIG. 8A with the parts engaged.

FIG. 8B is a cross-sectional view of the feedthrough of FIG. 8A with the parts engaged. As such, FIG. 8B can show when the first part 802 and the second part 804 are moved into an "engaged position." FIG. 8B shows feedthrough 800 that includes the first part 802 and the second part 804 of FIG. 8A with the second part 804 inserted into the first part 802. As shown, the engagement area 806 contacts a portion of the first part 802. Such contact can deform the first part 802 and/or the second part 804. Additionally, another portion of the second part 804 (e.g., the portion opposite that of the engagement area 806), also contacts the first part 802. Such contact and/or deformation can hold the first part 802 and the second part 804 together (e.g., the deformation can impart a spring force on the areas in contact to further hold the first part 802 and the second part 804 together), but can also be configured so that the amount of area in contact allows for the first part 802 and the second part 804 to move relative to each other when subjected to an outside force greater than a threshold force. When the first part 802 and the second part 804 are engaged, the respective parts can include lumens that are disposed generally concentrically with each other to allow for a wire or other electrical signal to pass through.

Figure 9:
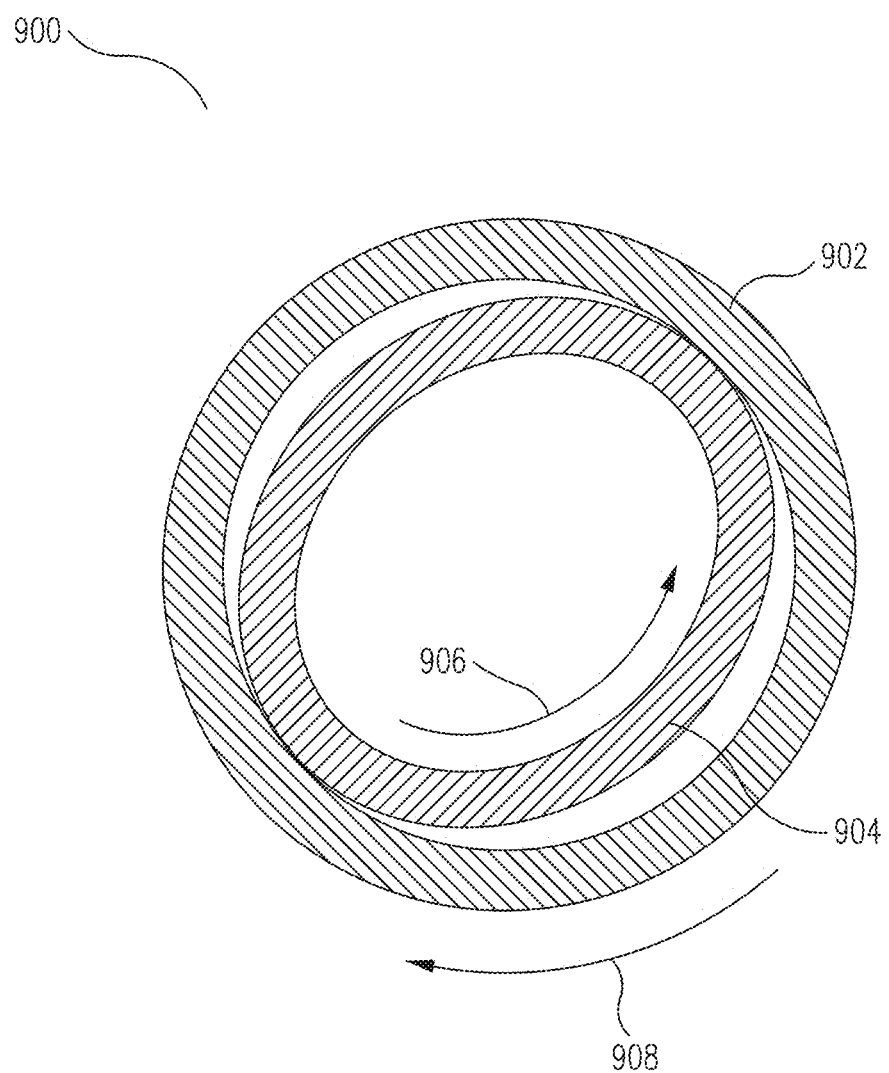
FIG. 9 is a cross-sectional view of another feedthrough with parts of dissimilar cross-sectional shapes.

FIG. 9 is a cross-sectional view of another feedthrough with parts of dissimilar cross-sectional shapes. FIG. 9 shows feedthrough 900 with a first part 902 and a second part 904. The feedthrough 900 is an example feedthrough that includes obround first part 902 and second part 904. As such, the first part 902 and the second part 904 can be oriented in a non-interference position and the first part 902 inserted into the second part 904. After insertion, the first part 902 can be rotated in direction 908 and the second part 904 can be rotated in direction 906 so that portions of the first part 902 and the second part 904 can be in contact. Such contact can hold the first part 902 and the second part 904 together while orientating the respective lumens of the first part 902 and the second part 904 to allow for a wire or other electrical signal to pass through.

Figure 10A:
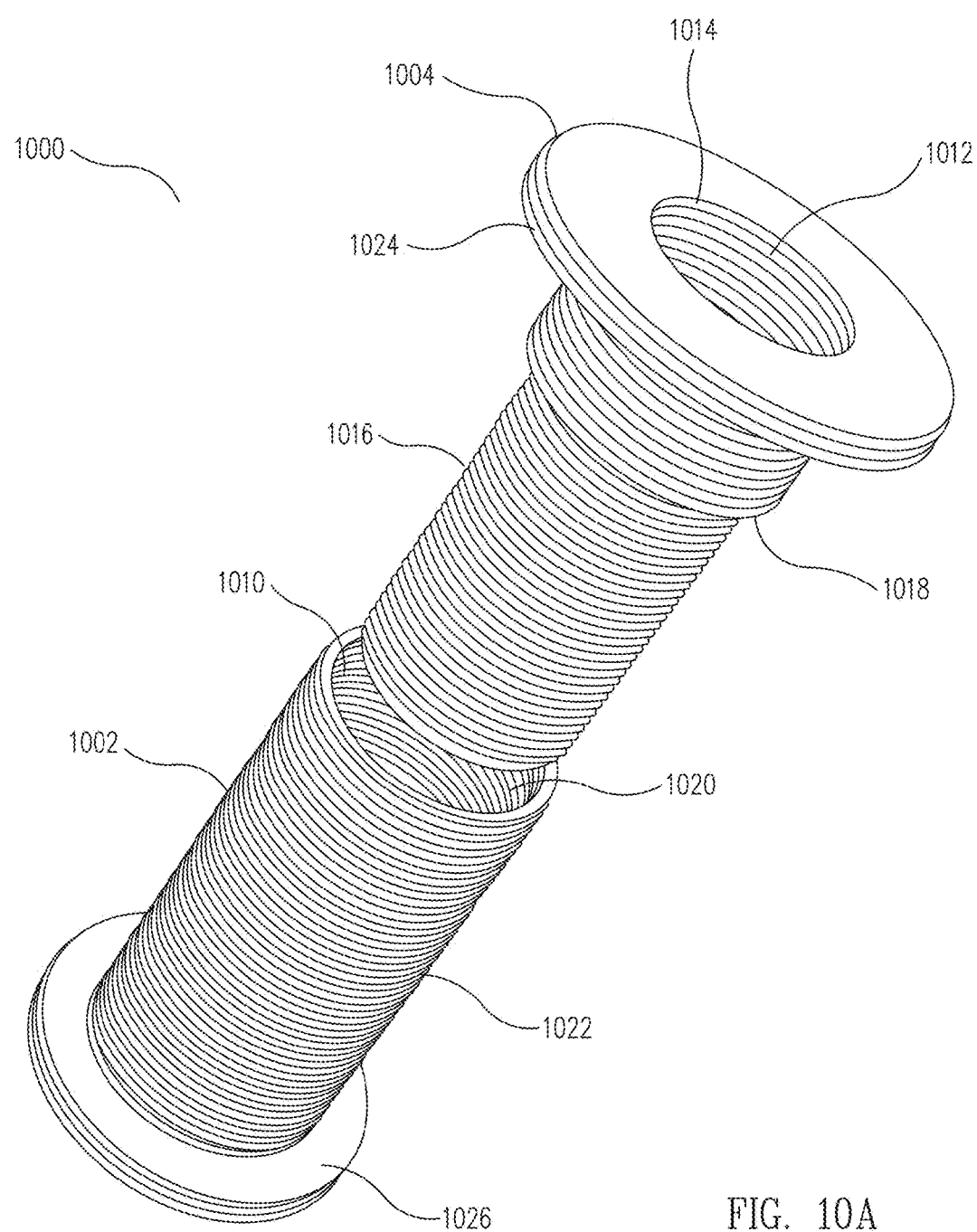
FIG. 10A is an end-and-side perspective view of a further example of a feedthrough.

FIG. 10A is an end-and-side perspective view of an example of a feedthrough. FIG. 10A illustrates feedthrough 1000 with first part 1002 and second part 1004. The first part 1002 includes a first lumen 1010, a first part inner ridged section 1020, a first part outer ridged section 1022, a first stop 1028 (not shown in FIG. 10A, but shown in FIG. 10B) and a first flange 1026. The second part 1004 includes a second lumen 1012, a second part inner ridged section 1012, a second part outer ridged section 1016, a second stop 1018, and a second flange 1024.

The first part 1002 is formed from a plurality of individual ridged sections (e.g., layers). At least some of the individual ridged sections can be substantially the same thickness. For example, the first part inner ridged section 1020 and the first part outer ridged section 1022 can both include individual ridged sections of substantially the same thickness (e.g., within a manufacturing tolerance).

In certain examples, certain inner ridged sections and outer ridged sections can be disposed on the same layer and each such inner ridged section and outer ridged section can be the same thickness. Such sections can be the same thickness as such inner and outer ridged sections are formed by the same manufacturing step. For example, the first part 1002 can be a 3D printed part, and each such inner and outer ridged sections can both be deposited as the same layer in a single manufacturing step. In other examples, the inner and outer ridged sections could include individual ridges of different thicknesses. In such examples, the inner and outer ridged sections can be formed through different techniques (e.g., for 3D printed parts, the inner and outer ridged sections can be formed by filament extrusions of different sizes).

One or both of the first part inner ridged section 1020 and the first part outer ridged section 1022 are configured to engage corresponding ridged section(s) of the second part 1004. For the feedthrough 1000, the first part inner ridged section 1020 is configured to engage the second part outer ridged section 1016. Accordingly, the first part inner ridged section 1020 and the second part outer ridged section 1016 are substantially similar thicknesses to allow for a ridge of the first part 1002 or the second part 1004 to be disposed in between two corresponding ridges of the respective other part. Engaging the first part inner ridged section 1020 with the second part outer ridged section 1016 can include disposing one or more individual sections (e.g., layers) of the second part outer ridged section 1016 between one or more individual sections of the first part inner ridged section 1020. Disposing the sections as such can hold the first part 1002 relative to the second part 1004. Such engagement can be performed by moving one or both of the first part 1002 and the second part 1004 through snapping and/or ratcheting between the individual sections.

When the first part 1002 and the second part 1004 are engaged, the first and second lumens that 1010 and 1012 are disposed generally concentrically with each other to allow for a wire or other electrical signal to pass through. The other ridged sections (e.g., the first part outer ridged section 1022 and/or the second part inner ridged section 1012) shown in FIG. 10A can be configured to engage with ridged sections of other parts.

The first stop 1028 and/or the second stop 1018 can be hard stops. The first stop 1028 is disposed on an inside portion of the body of the first part 1002 while the second stop 1018 is disposed on an outside portion of the body of the second part 1004. As such, for example, the second part 1004 can be inserted into the first part 1002 until a portion of the second part 1004 contacts the first stop 1028 and/or a portion of the first part 1002 contacts the second stop 1018. Further insertion of the second part 1004 into the first part 1002 can then be prevented.

Figure 10B:
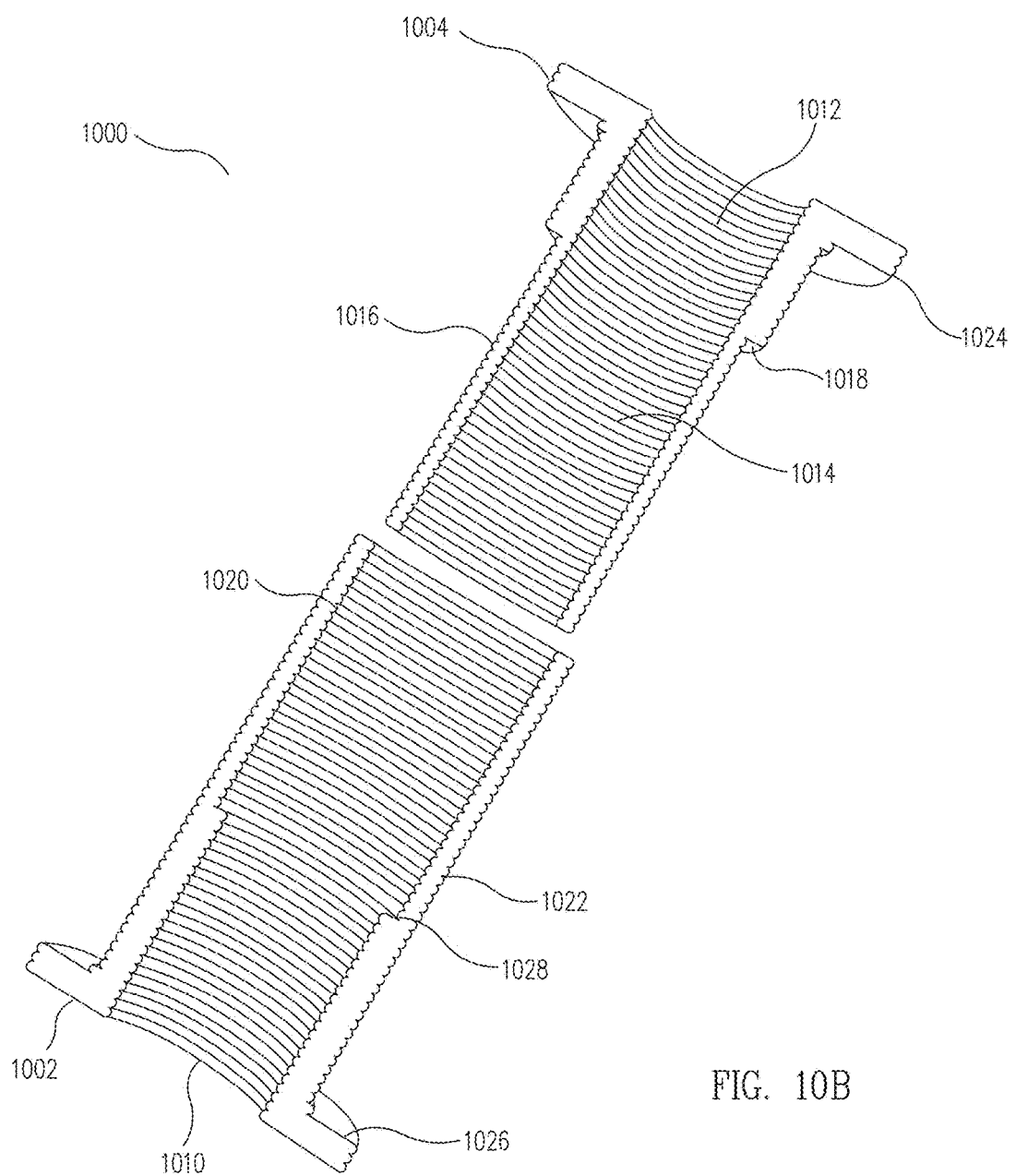
FIG. 10B is a side cutaway view of the further example of the feedthrough.

FIG. 10B is a side cutaway view of the further example of the feedthrough. FIG. 10B shows the feedthrough 100 shown in FIG. 10A. As shown in FIG. 10B, the outside diameter of the second part outer ridged section 1016 of the second part 1004 is substantially similar to the inside diameter of the first part inner ridged section 1020 of the first part 1002. In certain examples, portions of the second part outer ridged section 1016 (e.g., the peaks of the ridges) can have an outer diameter slightly larger than the inner diameter of portions of the first part inner ridged section 1020 (e.g., the depressions of the ridges) so that inserting the second part 1004 into the first part 1002 results in a snapping and/or ratcheting action. Such a feature also allows for an inserted second part 1004 to be held within the first part 1002 unless a force greater than a threshold force is applied to remove the second part 1004 from within the first part 1002. The first part 1002 and/or the second part 1004 can be configured so that the threshold force is at least partially determined by the shape of the ridges (e.g., curvature, diameter of the widest sections, diameter of the narrowest sections, transition between the sections) and/or the materials used.

Figure 10C:
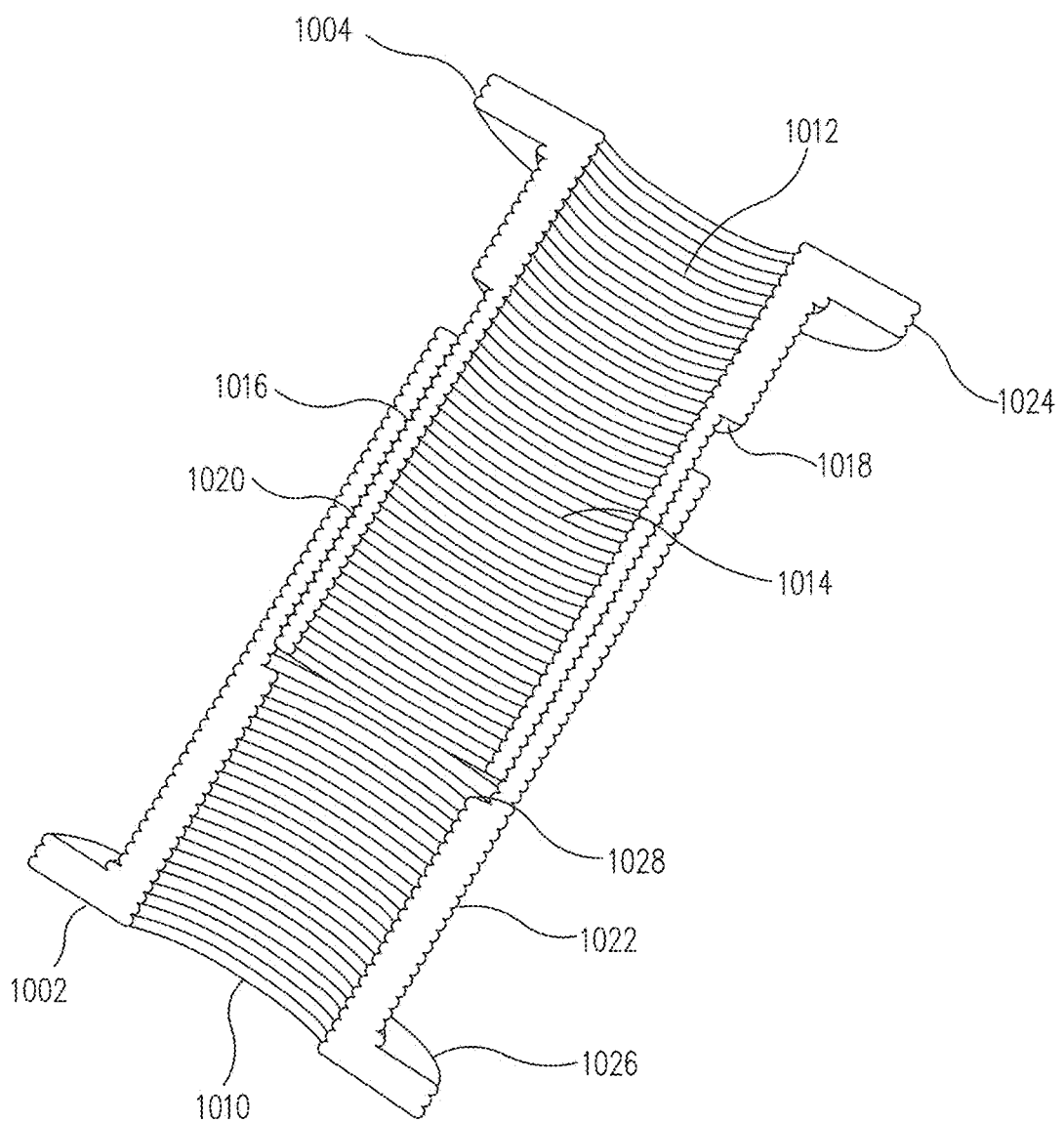
FIG. 10C is a side cutaway view of the further example of the feedthrough with the parts engaged.

FIG. 10C is a side cutaway view of the further example of the feedthrough with the parts engaged. FIG. 10C illustrates the feedthrough 1000 with the second part 1004 engaged with the first part 1002. As such, a portion of the second part 1004 is inserted into the first part 1002. As shown in FIG. 10C, the second part outer ridged section 1016 is engaged with the first part inner ridged section 1020. As such, at least some of the ridges of the second part outer ridged section 1016 are disposed between the depressions of the first part inner ridged section 1020. Disposing the ridged sections in such a fashion allows for the second part 1004 to be substantially held in place relative to the first part 1002.

Additionally, as shown in FIG. 10C, if the second part 1004 were further inserted, the second part 1004 could contact the first stop 1028. The first stop 1028 is located within the lumen 1010 and is a mechanical stop to prevent the second part 1004 from being inserted further into the first part 1002. Alternatively or additionally, the second stop 1018 can be a mechanical stop that also prevents the second part 1004 from being inserted further into the first part 1002.

Figure 10D:
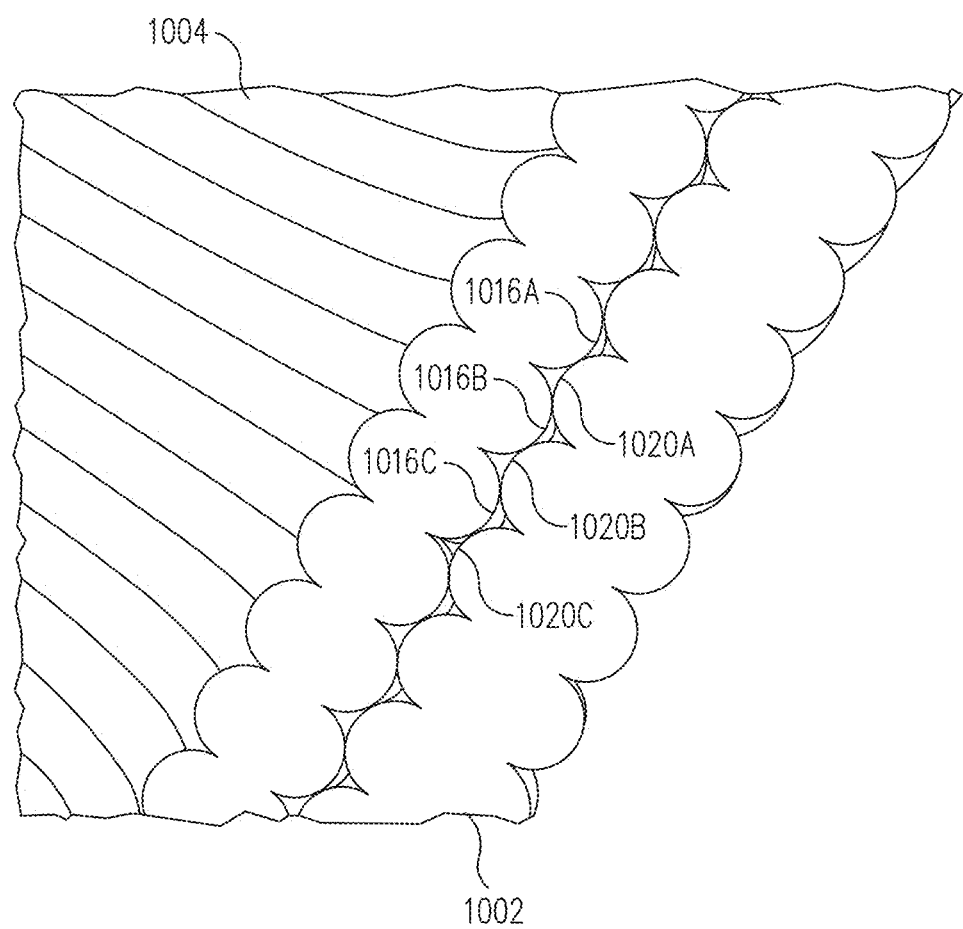
FIG. 10D is a zoomed in side cutaway view of an engagement mechanism of the feedthrough.

FIG. 10D is a zoomed in side cutaway view of an engagement mechanism of the feedthrough. FIG. 10D illustrates a zoomed in cutaway view of the second part 1004 that has been inserted into the first part 1002. FIG. 10D shows the second part outer ridged section 1016 that includes ridges 1016A-C and the first part inner ridged section 1020 that includes ridges 1020A-C. As shown, the peak of ridge 1016B is disposed within the depression between ridges 1020A and 1020B while the peak of ridge 1016C is disposed within the depression between ridges 1020B and 1020C. Such an arrangement allows for the second part 1004 to be moved relative to the first part 1002 while the second part 1004 is inserted into the first part 1002. The rounded profiles of the ridges 1016A-C and 1020A-C allow for the second part 1004 to be moved relative to the first part 1002 when a force greater than a threshold force is applied. Accordingly, the ridges 1016A-C can slide along the ridges of the first part 1002. In certain examples, such sliding can also include deformation of a portion of the first part 1002 and/or the second part 1004 to allow for the second part 1004 to move relative to the first part 1002. Such sliding can be accompanied by a ratcheting action of the respective parts.

Figure 10E:
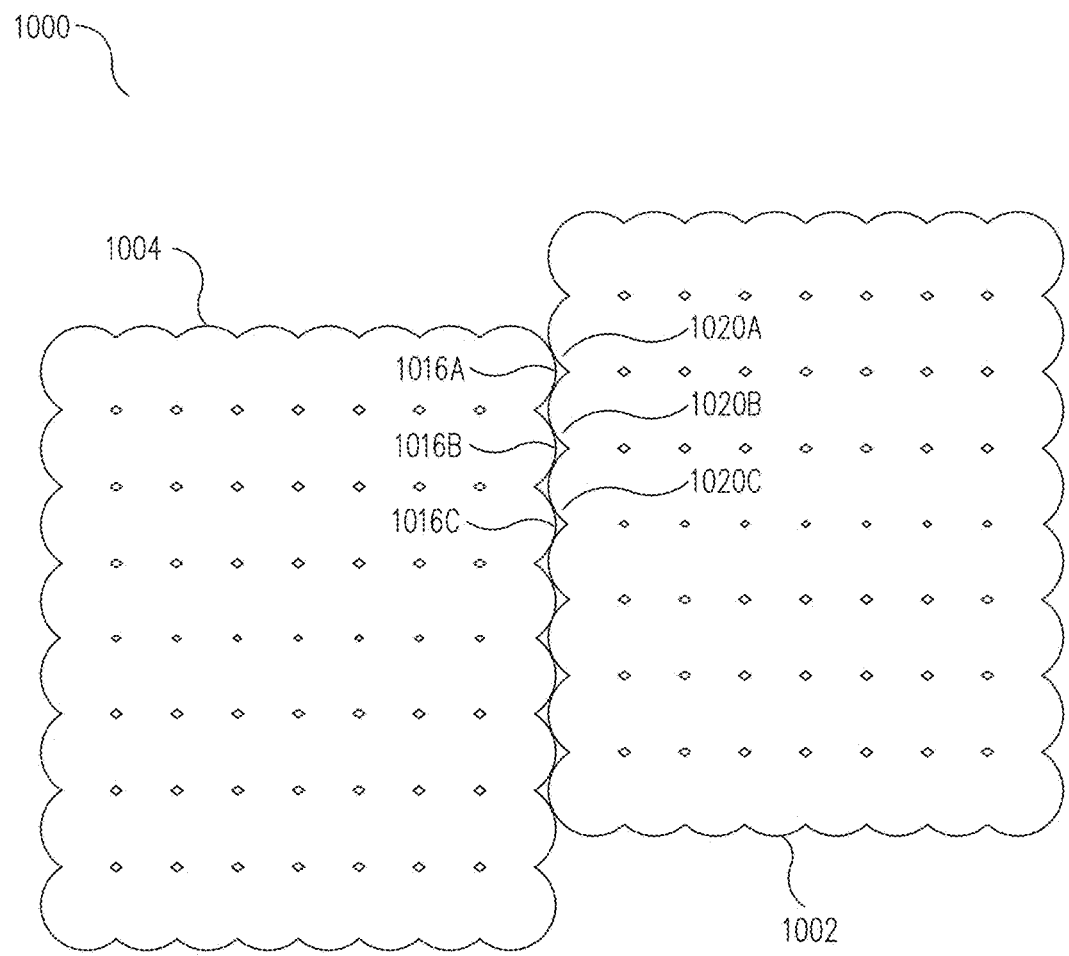
FIG. 10E is a side cross-sectional view of two parts of another feedthrough.

FIG. 10E is a side cross-sectional representation of the first part 1002 and the second part 1004 of feedthrough 1000. The first part 1002 and/or the second part 1004 can be machined, injection molded, 3D printed, cast, and/or produced through one or more other appropriate manufacturing techniques. Certain examples of the first part 1002 and/or the second part 1004 can include one or more production steps. As such, for example, a 3D printed first part 1002 and/or second part 1004 can be further finished in a machining operation.

In one example, the first part 1002 and/or the second part 1004 can be 3D printed with multiple layers of filament extrusions, as shown in FIG. 10E. The size (e.g., thickness) of the individual filament extrusion can, when solidified, be the thickness of an individual ridge (e.g., one of ridges 1016A-C or ridges 1020A-C). Accordingly, a 3D printer can deposit a filament extrusion layer and such a layer can form an individual ridge (e.g., one of the ridges 1016A-C or ridges 1020A-C). Depressions can be formed between the ridges. In certain examples, as a layer is formed, both the inner and outer portions of that layer can include ridges.

The structure and techniques disclosed in FIG. 10A-E (e.g., the ridges to hold the first part 1002 and the second part 1004 together) can be combined with any other structure or technique disclosed herein, such as the use of contact areas as shown in FIG. 8A-B, the use of dissimilar cross-sectional shaped parts, or any of the structures and techniques disclosed in FIGS. 1-7.

Figure 10F:
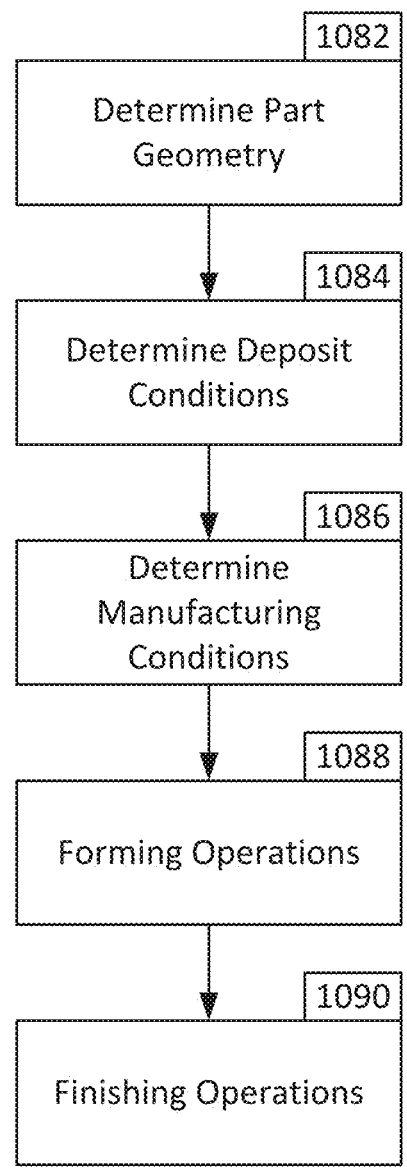
FIG. 10F is a functional block diagram of an example method of manufacturing the feedthroughs of the present disclosure; and, FIG. 11 is a perspective view of a three-piece feedthrough.

The first part 1002 and/or second part 1004 shown in FIG. 10A-E can be formed using the technique detailed in FIG. 10F. FIG. 10F is a functional block diagram of an example method of manufacturing the feedthroughs of the present disclosure.

In block 1082, the geometry of the part (e.g., the first part 1002 and/or the second part 1004) is determined. In certain examples, the geometry of the part can be determined according to the known production process. As such, if a part is to be produced by a 3D printing production process with filament extrusions of three possible different sizes, the thickness of the ridges can be one of those three different sizes and/or a multiple of the sizes. Such production can be modified according to the characteristic of the production process and/or machinery and/or process used in production. For example, filament extrusions of various thicknesses, such as thickness between 0.005 to 0.020 inches, can be used depending on the desired height for each individual layer. Additionally, material to be used during the production process can be selected. Such material can be any appropriate 3D printing material, including materials by Ultem. In certain examples, the material can be selected due to a degree of elasticity and/or slipperiness of the material. For example, a high impact plastic such as Ultem 9085 can be selected.

In optional block 1084 for 3D printing processes, the deposition conditions are determined. As such, the filament extrusion sizes, the rate of deposit, the environmental conditions during manufacture, the dimensions of the layers to be created, and/or other conditions are determined in block 1084. For example, in addition to the thickness of the filament extrusion, a width of the filament extrusion can also be determined. Thicker widths can allow for faster deposition of a layer, while thinner widths can allow for more detail within a layer. In certain other examples, block 1082 and block 1084 can be performed concurrently as, for example, the part geometry can be determined with the manufacturing conditions in mind and/or manufacturing processes can be selected according to the part geometry.

In block 1086, environment conditions for manufacture, such as ambient temperatures and curing conditions can be determined. For example, certain machinery can require positioning of the part being produced in certain areas and/or require specific environmental conditions to manufacture the part (e.g., ambient temperature at a certain temperature and/or a certain temperature gradient within the manufacturing apparatus). In certain examples, the ambient temperatures can be between 300 to 1,000 degrees Fahrenheit. Proper ambient temperatures can allow for layers to more fully bound with each other, creating a stronger, more elastic, and/or tighter tolerance'd part.

In block 1088, the part can be formed. For a 3D printing process, filament extrusions can be deposited according to the geometry and conditions determined in blocks 1002-1006. In certain examples, the same thickness filament extrusions can be used to form an entire layer (e.g., the layer can include both inner and outer ridged portions of the same thickness) while other examples can use different thickness filament extrusions to form different portions of the layer (e.g., the inner and outer portions of a layer). In certain other examples, a single ridge can be made from multiple layers of filament extrusions.

In block 1090, finishing operations can be performed. For example, flash and other items can be trimmed from the part. Additionally, the part can be cured. In certain such examples, the curing of the part can be conducted in a manufacturing apparatus or a portion of the manufacturing apparatus that includes an even temperature gradient.

Figure 11:
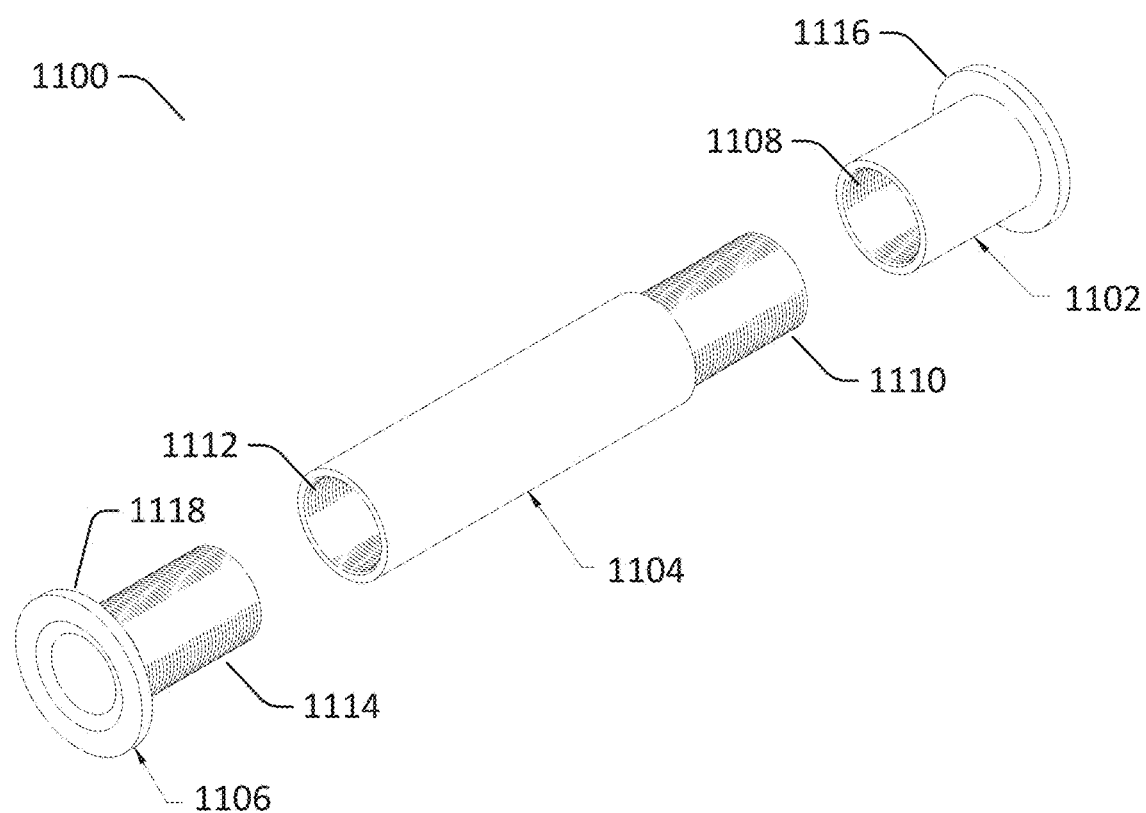

FIG. 11 is a perspective view of a three-piece feedthrough. FIG. 11 illustrates a multi-part feedthrough 1100 that includes a first part 1102, a second part 1104, and a third part 1106. The first part 1102 includes a flange 1116 and a first engagement area 1108. The second part 1104 includes an upper second engagement area 1110 and an additional engagement area, a lower second engagement area 1112. The upper second engagement area 1110 can be configured to engage the first engagement area 1108. The lower second engagement area 1112 can be configured to engage a third engagement area 1114 of the third part 1106. The third part 1106 can further include a third engagement area 1118. The engagement areas of the feedthrough 1100 can be any such engagement areas described herein.

Each of the first part 1102, the second part 1104, and the third part 1106 can include lumens that, when the feedthrough 1100 is assembled, allows for wires and/or other electrical signals to pass through, as described herein. In certain examples, both engagement areas of the second part 1104 can be male and/or female engagement mechanisms. As such, the first part 1102 and the third part 1106 can include corresponding engagement mechanisms configured to engage with the engagement mechanisms of the second part 1104. Such a configuration can allow for a standardized second part as well as first and third parts that can be of the same configuration, reducing part count. Other examples of feedthroughs can include four or more parts.

As those of some skill in this art will by now appreciate, and depending on the particular application at hand, many modifications, substitutions and variations can be made in and to the materials, apparatus, configurations and methods of the present disclosure without departing from the spirit and scope thereof. In light of this, the scope of the present invention should not be seen as limited to those of the particular embodiments illustrated and described herein, as they are merely by way of some examples thereof, but rather, should be fully commensurate with that of the claims appended hereafter and their functional equivalents.

What is claimed is:

1. A feedthrough, comprising:
    a first part comprising:
        a first body configured to be disposed in a first portion of an opening in a panel,
        a first lumen disposed within the first body, and
        a first engagement area comprising a first contact area; and
    a second part comprising:
        a second body configured to be disposed in a second portion of the opening in the panel,
        a second lumen disposed within the second body, and
        a second engagement area configured to engage the first contact area, wherein engaging the first contact area with the second engagement area causes deformation of the first part, the second part, or both the first part and the second part to hold the first part and the second part within the opening such that the first lumen and the second lumen are disposed generally concentrically with each other.

2. The feedthrough of claim 1, wherein at least a portion of a cross-sectional area of the first engagement area is different from at least a portion of a cross-sectional area of the second engagement area.

3. The feedthrough of claim 2, wherein the second engagement area is configured to engage the first contact area when the first body and second body are rotationally moved into an engagement position.

4. The feedthrough of claim 1, wherein the first contact area comprises a raised bump.

5. The feedthrough of claim 1, wherein the first engagement area comprises a plurality of contact areas.

6. The feedthrough of claim 5, wherein the plurality of contact areas comprise a plurality of raised bumps.

7. The feedthrough of claim 1, wherein the second part further comprises a second part additional engagement area and the feedthrough further comprises:
    a third part comprising:
        a third body configured to be disposed in a third portion of the opening in the panel,
        a third lumen disposed within the third body, and
        a third engagement area configured to engage the second part additional engagement area.

8. The feedthrough of claim 1, wherein the first lumen and the second lumen are each configured to allow a wire to pass within first lumen and the second lumen.

9. The feedthrough of claim 1, further comprising a first electroconductive path disposed on the first part and a second electroconductive path on the second part, wherein the first electroconductive path and the second electroconductive path are configured to be electroconductively coupled to each other when the first and second parts are coupled together.

10. The feedthrough of claim 9, wherein the first electroconductive path is disposed on a first interior surface of the first lumen and the second electroconductive path is disposed on a second interior surface of the second lumen.

11. A feedthrough, comprising:
a first part comprising:
a first body configured to be disposed in a first portion of an opening in a panel,
a first lumen disposed within the first body, and
a first engagement area comprising a plurality of first ridged sections; and
a second part comprising:
a second body configured to be disposed in a second portion of the opening in the panel,
a second lumen disposed within the second body, and
a second engagement area comprising a plurality of second ridged sections disposed within the second lumen and configured to engage at least a portion of the first ridged sections, wherein the first engagement area, the second engagement area, or both the first engagement area and the second engagement area are configured to deform when the second engagement area is being inserted into the first engagement area, and wherein the first engagement area and the second engagement area, when engaged, are configured to hold the first part and the second part within the opening such that the first lumen and the second lumen are disposed generally concentrically with each other.

12. The feedthrough of claim 11, wherein engaging the first engagement area with the second engagement area comprises positioning one of the first ridged sections between two of the second ridged sections.

13. The feedthrough of claim 11, wherein each of the first ridged sections and the second ridged sections are substantially similar thicknesses.

14. The feedthrough of claim 11, wherein:
the first part further comprises a first hard stop disposed on an outside portion of the first body; and
the second part further comprises a second hard stop disposed within the second lumen.

15. The feedthrough of claim 11, wherein the second part further comprises a second part additional engagement area comprising a plurality of additional ridged sections disposed on an outer portion of the second body.

16. The feedthrough of claim 15, wherein the additional ridged sections are a different thickness than the second ridged sections.

17. The feedthrough of claim 11, wherein the second part further comprises a second part additional engagement area and the feedthrough further comprises:
a third part comprising:
a third body configured to be disposed in a third portion of the opening in the panel,
a third lumen disposed within the third body, and
a third engagement area configured to engage the second part additional engagement area.

18. The feedthrough of claim 17, wherein the second part further comprises a second part additional engagement area comprising a plurality of additional ridged sections disposed on an outer portion of the second body and the third engagement area comprises a plurality of third ridged sections disposed within the third lumen.

19. A method of manufacturing the first part or the second part of claim 11, the method comprising:
depositing a ridged section first layer of a first thickness; and
depositing, above the first layer, a ridged section second layer of substantially the same thickness as the first thickness.

20. The method of claim 19, wherein depositing the first layer comprises depositing a plurality of filament extrusions of the first thickness.

* * * * *